United States Patent
Park et al.

(10) Patent No.: US 11,143,610 B2
(45) Date of Patent: Oct. 12, 2021

(54) SENSING ELEMENT COMPOSITIONS AND SENSOR SYSTEM FOR DETECTING AND MONITORING STRUCTURES FOR HYDROCARBONS

(71) Applicant: DIRECT-C LIMITED, Edmonton (CA)

(72) Inventors: Simon Park, Calgary (CA); Kaushik Parmar, Calgary (CA)

(73) Assignee: DIRECT-C LIMITED, Edmonton (CA)

( * ) Notice: Subject to any disclaimer, the term of this patent is extended or adjusted under 35 U.S.C. 154(b) by 363 days.

(21) Appl. No.: 15/030,029

(22) PCT Filed: Oct. 14, 2014

(86) PCT No.: PCT/CA2014/050992
§ 371 (c)(1),
(2) Date: Apr. 15, 2016

(87) PCT Pub. No.: WO2015/054784
PCT Pub. Date: Apr. 23, 2015

(65) Prior Publication Data
US 2016/0238547 A1    Aug. 18, 2016

Related U.S. Application Data

(60) Provisional application No. 61/891,248, filed on Oct. 15, 2013.

(51) Int. Cl.
*G01V 3/26* (2006.01)
*G01N 27/04* (2006.01)
(Continued)

(52) U.S. Cl.
CPC .......... *G01N 27/045* (2013.01); *C08K 3/041* (2017.05); *C08K 3/042* (2017.05); *C08K 3/22* (2013.01);
(Continued)

(58) Field of Classification Search
CPC ... G01V 3/26; G01V 3/38; G01V 3/30; G01V 3/28; G01V 3/20; G01V 3/18;
(Continued)

(56) References Cited

U.S. PATENT DOCUMENTS 3,045,198 A    7/1962    Dolan et al.
4,224,595 A    9/1980    Dolan
(Continued)

FOREIGN PATENT DOCUMENTS

EP    2065681    6/2009
JP    H02132357 A    5/1990
(Continued)

OTHER PUBLICATIONS

Ho, Clifford K., et al. "Review of Chemical Sensors for In-Situ Monitoring of Volatile Contaminants." Sandia Report (2011).
(Continued)

*Primary Examiner* — Jermele M Hollington
*Assistant Examiner* — Taqi R Nasir
(74) *Attorney, Agent, or Firm* — Burdick Patents, P.A.; Sean D. Burdick

(57) ABSTRACT

Carbon nanotubes, graphene nanoplatelets, and/or metal oxides are incorporated in a polymer to form a sensing element that may be applied on to a surface for sensing hydrocarbon leakage, mechanical stress, and/or temperature change of a hydrocarbon transportation and/or storage structure. Electrical signals from the sensing element are processed to check for indicators of leakage, stress and/or temperature change.

18 Claims, 18 Drawing Sheets

(51) Int. Cl.
  *G01M 3/16* (2006.01)
  *G01D 5/12* (2006.01)
  *C08L 101/12* (2006.01)
  *G01M 3/18* (2006.01)
  *G01K 7/16* (2006.01)
  *C08K 3/04* (2006.01)
  *C08K 3/22* (2006.01)
  *C08K 7/24* (2006.01)

(52) U.S. Cl.
  CPC .............. *C08K 7/24* (2013.01); *C08L 101/12* (2013.01); *G01D 5/12* (2013.01); *G01K 7/16* (2013.01); *G01M 3/165* (2013.01); *G01M 3/18* (2013.01); *C08K 2003/2241* (2013.01); *C08K 2003/2272* (2013.01); *C08K 2003/2296* (2013.01); *C08K 2201/001* (2013.01); *C08K 2201/011* (2013.01); *G01K 2211/00* (2013.01)

(58) Field of Classification Search
  CPC . G01V 13/00; G01V 3/34; G01V 3/24; G01N 27/045; G01N 17/00; G01N 17/006; G01N 17/02; G01D 5/12; G01K 7/16; G01R 33/00
  USPC ....... 324/693, 692, 324, 333, 338, 346, 355, 324/368, 372, 221, 439
  See application file for complete search history.

(56) References Cited

U.S. PATENT DOCUMENTS

| | | | |
|---|---|---|---|
| 4,631,952 | A | 12/1986 | Donaghey |
| 4,752,761 | A | 6/1988 | Dolan et al. |
| 4,855,706 | A | 8/1989 | Hauptly |
| 4,862,066 | A | 8/1989 | Yoshiaki et al. |
| 4,894,636 | A | 1/1990 | Sugibuchi et al. |
| 5,079,944 | A | 1/1992 | Boenning |
| 5,150,603 | A | 9/1992 | Boenning |
| 5,256,574 | A | 10/1993 | Neuburger et al. |
| 5,382,909 | A | 1/1995 | Masia et al. |
| 5,417,100 | A | 5/1995 | Miller |
| 5,514,338 | A | 5/1996 | Simon |
| 6,433,694 | B1 | 8/2002 | Dolan et al. |
| 7,112,304 | B2 | 9/2006 | Starling et al. |
| 7,138,090 | B2 | 11/2006 | Blok |
| 7,391,225 | B1 | 6/2008 | Lee et al. |
| 7,645,422 | B2 | 1/2010 | Blok et al. |
| 7,708,947 | B2 | 5/2010 | West et al. |
| 7,955,561 | B2 | 6/2011 | Lewis et al. |
| 8,012,420 | B2 | 9/2011 | Ramamurthy |
| 8,105,538 | B2 | 1/2012 | Ramamurthy et al. |
| 8,691,390 | B2 | 4/2014 | Ramamurthy |
| 8,839,659 | B2 | 9/2014 | Xiao |
| 8,931,553 | B2 * | 1/2015 | Cannan .................. C23C 14/35 166/250.01 |
| 9,250,148 | B2 | 2/2016 | Manohara et al. |
| 2006/0249384 | A1 * | 11/2006 | Kim ..................... G01N 27/127 204/424 |
| 2006/0292033 | A1 | 12/2006 | Blok et al. |
| 2007/0117207 | A1 | 5/2007 | West et al. |
| 2008/0017507 | A1 | 1/2008 | Ramamurthy et al. |
| 2008/0250869 | A1 | 10/2008 | Breed et al. |
| 2009/0007636 | A1 | 1/2009 | Starling |
| 2009/0130421 | A1 | 5/2009 | Ramamurthy |
| 2010/0194409 | A1 * | 8/2010 | Gao .................... G01N 33/5438 324/693 |
| 2010/0272612 | A1 | 10/2010 | Ramamurthy |
| 2011/0051775 | A1 | 3/2011 | Ivanov et al. |
| 2011/0286889 | A1 | 11/2011 | Ramamurthy et al. |
| 2012/0313860 | A1 | 12/2012 | Hashimura et al. |
| 2013/0129916 | A1 * | 5/2013 | Katsumura ............ H05K 3/125 427/98.4 |
| 2013/0218050 | A1 | 8/2013 | Eichhorn et al. |
| 2014/0129916 | A1 * | 5/2014 | Tuovinen ............ G06F 11/3684 715/234 |
| 2014/0249612 | A1 * | 9/2014 | Bonmassar ........ C09K 19/3809 607/116 |
| 2015/0037895 | A1 | 2/2015 | Lobez |
| 2015/0050741 | A1 | 2/2015 | Tour et al. |
| 2015/0136234 | A1 | 5/2015 | Zulfiquar |
| 2015/0202616 | A1 * | 7/2015 | Richardson ............... C02F 1/76 521/31 |
| 2015/0219520 | A1 | 8/2015 | Yu |
| 2015/0330930 | A1 | 11/2015 | Gao et al. |
| 2016/0033403 | A1 * | 2/2016 | Packirisamy ........ G01N 21/554 422/69 |

FOREIGN PATENT DOCUMENTS

| | | |
|---|---|---|
| JP | H0373838 A | 3/1991 |
| KR | 20080098286 A | 11/2008 |
| KR | 20110007501 A | 1/2011 |
| KR | 20110035232 A | 4/2011 |
| KR | 101132124 B1 | 3/2012 |
| WO | 2015002360 A1 | 1/2015 |
| WO | 2016029003 A1 | 2/2016 |

OTHER PUBLICATIONS

Pejcic, Bobby, et al. "Environmental Monitoring of Hydrocarbons: A Chemical Sensor Perspective." Environmental Science and Technology (2007).
Wang, Li-Chun, et al. "A Single-Walled Carbon Nanotube Network Gas Sensing Device." Sensors (2011).
Sharma, Vishash. Vibro-Acoustic Monitoring of Pipeline Leakage and Corrosion. Thesis. University of Calgary, 2013.
Supplementary European Search Report issued for EP 14854567 dated Jul. 14, 2017.

* cited by examiner

Composition 5

Composition 6

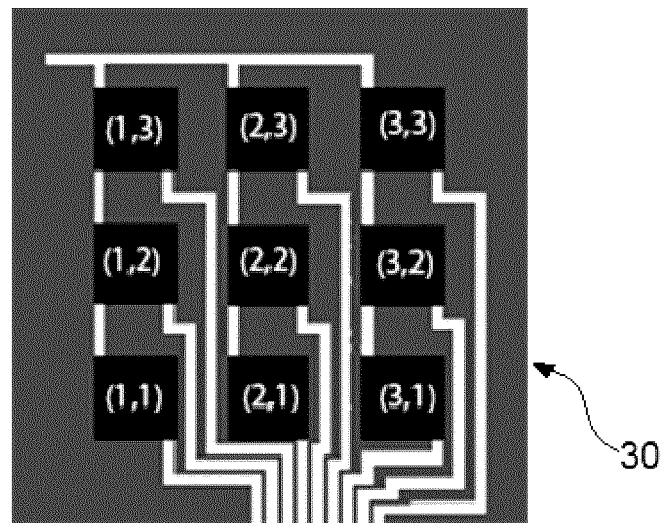
FIG. 8
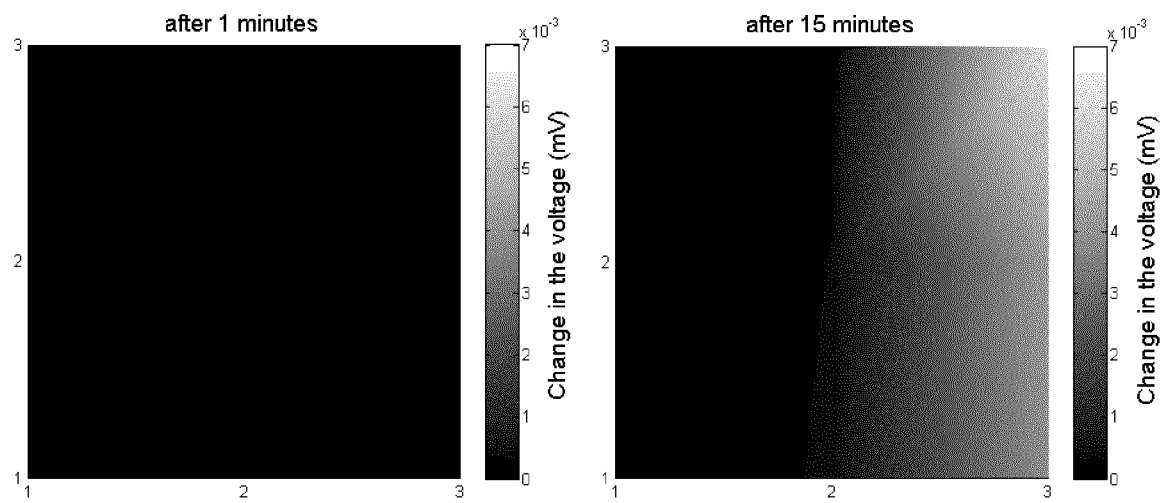
FIG. 9a  FIG. 9b

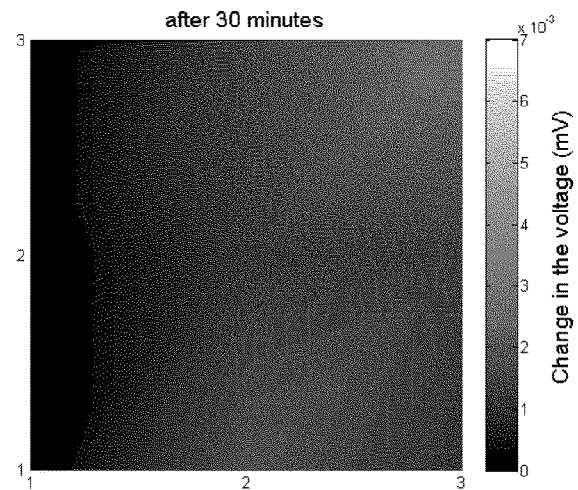
FIG. 9c
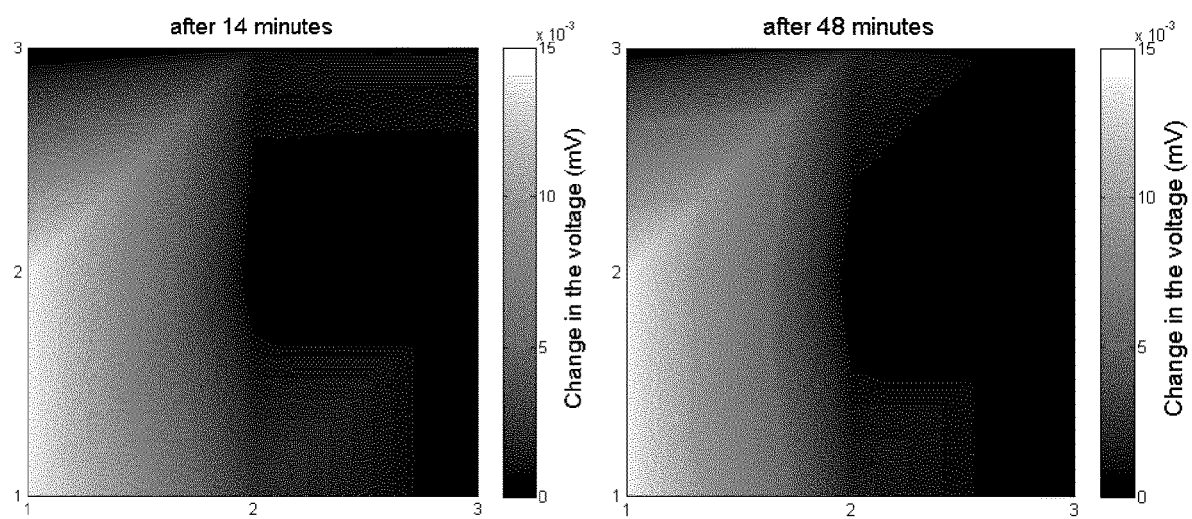
FIG. 10a  FIG. 10b

SENSING ELEMENT COMPOSITIONS AND SENSOR SYSTEM FOR DETECTING AND MONITORING STRUCTURES FOR HYDROCARBONS

PRIORITY APPLICATION

This application claims priority from U.S. provisional patent application No. 61/891,248, filed Oct. 15, 2013.

FIELD OF THE INVENTION

The present invention relates a sensor skin and a system usable for direct and/or active detection and monitoring of hydrocarbon leakage in oil and gas pipelines, storage structures, and/or transportation structures. More particularly, the present invention relates to sensor skin comprising a network of sensing elements capable of detecting the presence of hydrocarbons, stress, and/or temperature which can be used to monitor the integrity of any hydrocarbon transportation or storage systems and/or structures, including pipelines, pressure vessels, tanks, etc. The present invention also relates to a method of fabricating the sensor skin.

BACKGROUND OF THE INVENTION

Disruptions, structural deficiencies, and wear and tear in any hydrocarbon transportation or storage systems can cause leakage, which often leads to significant financial losses, environmental contamination, and endangerment to public safety. In order to maintain structural integrity of these systems, the monitoring of structures for defects and leakage is critical. The occurrence of leaks involves the uncontrolled outflow of hydrocarbons. Since hydrocarbon transportation systems such as pipelines are usually in kilometric lengths, structural monitoring for leakage is an issue. To detect pipeline leakage, the systems currently employed range from simple, visual checking by walking along the pipe line to checking using complex arrangements of hardware and software. Some examples of known leak detection methods are Mass Balance, Pressure Point Analysis, Flow Deviation, Acoustic Emission systems, Chemical based systems, Temperature profiles, neural networks, Fiber optic sensing technologies, etc.

The abovementioned leakage detection methods have various limitations. For example, visual monitoring is limited by a lack of accessibility of pipelines because many pipelines are buried or underwater. Acoustic methods suffer from a limited detection range. While fiber optic systems are difficult to implement on existing pipeline structures and such a system is prone to malfunction if there is damage to the sensing cable. Microwave reflectometry systems have been used to localize water leakage from water pipelines. However, such systems require a microwave source and user station close to the pipeline. Apart from above mentioned limitations, most existing leakage detection methods measure leakage indirectly or passively. They also fail to detect or measure small leaks which are the precursor to bigger leaks.

a) Sensing Skin Composition

For direct or active detection of hydrocarbon leakage through chemi-resistor materials have been developed for the monitoring volatile chemicals or hydrocarbon leakage. For example, U.S. Pat. No. 5,498,372, entitled, "Oil leakage sensor", describes fabrication of an oil-leakage sensor based on porous water repellent resin admixed with electrically conductive carbon particles. Similarly, U.S. Pat. No. 5,498,372, entitled, "Electrically conductive polymeric compositions" cites many polymers with electrically conductive carbon black particles as filler materials. A conductive polymer is normally formed when the concentration of the electric conductive fillers reach a critical value, which is known as the "percolation threshold". The other fillers such as carbon black and metallic particulates which are also used for producing conductive polymers exhibit much higher percolation thresholds which also adversely affects the mechanical stability of polymers.

U.S. Pat. No. 8,012,420, entitled, "Robust low resistance vapor sensor materials" describes compositions of polymer and a plurality of conductive particles for volatile vapor sensing. They used axial geometry conductive particles such as carbon nanotube and carbon black as conductive fillers inside polymers. However, they did not incorporate graphene nano platelets. Due to their much smaller size and planer structure, it facilitates the electron transport increasing conductivity considerably at lower concentration compared to carbon black. It also provides higher strength to weight ratio compared to carbon black providing higher mechanical and thermal stability to the polymer composite.

Apart from carbon based nanoparticulates, U.S. Pat. Pub. 2006/0249384, entitled, "Chemical sensor", describes a chemical sensor for detection of a gaseous chemical species which incorporates metal oxide nanoparticles as sensing element. The electric conductivity of the sensor varies depending on adsorption of the chemical species on a large surface area of the crystalline metal oxide nanoparticles on the sensor surface.

E. P. Pat. No. 2,572,187, entitled, "Metal and metal oxide co-functionalized single walled carbon nanotube for high performance gas sensors", proposed a tin oxide nanoparticles synthesized onto the single-walled carbon nanotube coated with metal nanoparticles to fabricate high performing gas sensor. The patent describes the use of the carbon nanotubes and metal oxide, simultaneously to improve the performance of the gas sensors.

Most of the patents and work mentioned above primarily disclose various compositions and use of conductive nano materials and/or metal oxide nanoparticles, but they do not describe any specific composition suitable for use with oil and gas pipelines and storage/transportation structures. They also provide very little information on producing cost effective and high performance prototype sensor systems that can be installed on such structures for hydrocarbon leakage detection and monitoring.

b) Multi Array Fabrication

To implement sensing elements skin discussed above on the vast pipeline system, a multi array sensing element network distributed over the pipeline surface is required. U.S. Pat. No. 8,414,489, entitled "Fabrication of multi-sensor arrays", discloses the methods for fabricating multi-sensor array for a long-term analyte sensor where the analyte is glucose. This patent provides a method for fabricating a large scale multi-sensor array system based on low cost roll-to-roll manufacturing method incorporating air spray.

E. P. Pat. No. 2,433,716, entitled, "Surface spraying device with a nozzle control mechanism and corresponding method", discloses a handheld, dynamically movable surface sputtering device comprising of one or more nozzles and a nozzle control mechanism to sputter materials on to a substrate. It reports that the area that can be sputtered on the target surface is dependent on the set of nozzle characteristics such as distance and inclination of the nozzle from the target surface. However, due to lack of computer control and algorithm, it is limited for the small surface sputtering.

E. P. Pat. No. 1,740,313, entitled, "Cost effective automated preparation and coating methodology for large surfaces", proposes an apparatus and method of coating on large surface such as a ship's hull using plurality of spray guns disposed in array positioned using a robotic arm. The array of the spray guns travels linearly down and makes strips. They provide an algorithm to paint large surface area. But except for the control over positions of different spray nozzles, the method lacks control over individual spray gun characteristics such as air pressure, mass flow rate and thickness control.

U.S. Pat. No. 4,614,300, entitled, "Computerized spray machine", has put forward the improved design of spray machine with computer control. The spray apparatus provides the control over the speed and acceleration of horizontal and vertical movements of the spray gun. It also proposes the method to control over dwell time during spraying using a computer system. The computer system also provides assistance in actuating, monitoring and correcting parameters of the spray procedure to insure a desired spray pattern on the substrate. However, the system requires adjustable spray nozzle and feedback parameters from every components of the system such as air pump, motor controller.

c) Electronics

In multi-array and/or network systems, identification of sensing element electrodes is important to identify the location of the hydrocarbon leakage as well as the flow pattern and size of the structural failure. There are various methods presented for electrode identification. U.S. Pat. No. 5,813,404, entitled, "Electrode connector system" taught electrode identification system based on providing a specific code to each electrode which could be recognized when connected to the digital signal converter. While U.S. Pat. No. 7,339,580, entitled, "Method and apparatus for integrating manual input", presents a proximity transduction circuit which is placed under each electrode to construct flexible multi-touch surface system. U.S. Pat. No. 8,384,136, entitled, "Demultiplexed nanowire sensor array for detection of chemical and biological species" describes a nanowire sensor array for detecting chemical and biological species containing a demultiplexer array.

d) Data Processing & Monitoring

There are various methods for finding the location of a disturbance. For example, U.S. Pat. Pub. No. 2007/0247303, entitled "Event localization within a distributed sensor array," proposes a method for event localization based on the signal received from the multiple sensor nodes. The localization of a disturbance is performed based on receiving signals that corresponds to the relative proximity of the sensor nodes to the disturbance. The patent discloses an algorithm which determines the location of disturbance by activating only nearby sensor nodes consuming less power. However, due to the lack of a multiplexing system, it is difficult for such systems to handle large amounts of data and to be monitored remotely.

Adaptive Neuro-Fuzzy Interference System (ANFIS) is used in analyzing large amounts of data coming from the sensor network system. ANFIS is combination of artificial neural network and fuzzy inference system. A fuzzy inference systems consists of fuzzy rules (if-then) and based on the past training defines the membership functions associated with the fuzzy sets used in fuzzy rules and infers a decision. In order to come up with the membership functions, the ANFIS utilizes an artificial neural network which is based on the biological nervous system which consists of multiple layers of processing elements called neurons that collect inputs and generate output [Jang et al. 1993].

The ANFIS model provides the means for fusing various sensing element signals and gives the decisions under different conditions. The ANFIS algorithm is trained previously, using a set of sensitivity factors obtained through calibration tests, to determine the sensor response and generate the set of fuzzy rules that transforms the inputs, i.e. the electrical signals from electrodes using the sensitivity parameters (i.e. hydrocarbon detection, stress, and/or temperature).

There are many inventions proposed which uses ANFIS algorithm for various different applications. E. P. Pat. No. 2551798 A1, entitled, "Genetic Algorithm-based training of an ANFIS for electric energy consumption forecasting" provides the method of predicting the electric consumptions in various industrial production systems using ANFIS algorithm. The real time inference algorithm, which determines the selection criteria based on input signals consists of range of operating parameters of system. The input data is fed in to fusion hierarchy and fuzzy inference logic is applied to predict the output.

SUMMARY OF THE INVENTION

According to a broad aspect of the present invention, there is provided a composition for use in a sensing element for one or more of: (i) monitoring leakage, (ii) a structural change, and (iii) temperature change in a hydrocarbon transportation or storage structure, the composition comprising: a polymer; and conductive and/or semi conductive nanoparticles admixed with and dispersed within the polymer According to another broad aspect of the present invention, there is provided a sensor system for one or more of: (i) monitoring leakage, (ii) a structural change, and (iii) temperature change in a hydrocarbon transportation or storage structure, the sensor system comprising: one or more sensing element comprising a polymer and conductive and/or semi conductive nanoparticles admixed with and dispersed within the polymer, each sensing element having a positive electrode and a passive electrode, the passive electrode being connected to ground; and a data acquisition system in communication with the positive electrode, for receiving electrical signals from the one or more sensing elements.

According to yet another broad aspect of the present invention, there is provided a system for collecting and processing signals from a sensor network comprising a plurality of sensing elements, each of the sensing elements exhibiting a change in resistance in response to one or more of: presence of hydrocarbon, a change in vibration signature, and temperature change, each of the sensing elements having an electrode, the system comprising: a voltage divider circuit connected to each of the sensing elements for converting the change in resistance therein into a voltage signal, the voltage divider circuit comprising a current limiting resistance connected in series to sensing element; a multiplexer microswitch in communication with the voltage divider circuit, for detecting and recording the voltage signals; and an adaptive neuro-fuzzy inference system (ANFIS) in communication with the multiplexer microswitch, the ANFIS calibrated to process the voltage signals and provide information relating to the status of the sensor network's surroundings.

BRIEF DESCRIPTION OF THE DRAWINGS

Referring to the drawings, several aspects of the present invention are illustrated by way of example, and not by way of limitation, in detail in the figures, wherein:

FIG. 8 is a schematic diagram of the sensor system of FIG. 6 with the sensing element electrodes referenced by coordinates;

FIGS. 9a, 9b, and 9c are exemplary voltage change maps at about 1 min, 15 min, and 30 min, respectively, from a hydrocarbon vapor detection experiment on the sensor system of FIG. 8, wherein the sensing elements are made of 10 wt. % MWCNT and 90 wt. % polysiloxane copolymer, and wherein sensor (3,3) is exposed to hydrocarbon vapor;

FIGS. 10a and 10b are exemplary voltage change maps at about 14 min and 48 min, respectively, from a hydrocarbon vapor detection experiment on the sensor system of FIG. 8, wherein the sensing elements are made of 5 wt. % CNT and 5 wt. % xGNP and 90 wt. % polysiloxane copolymer, and wherein sensor (1,1) is exposed to hydrocarbon vapor;

DETAILED DESCRIPTION OF VARIOUS EMBODIMENTS

Figure 1:
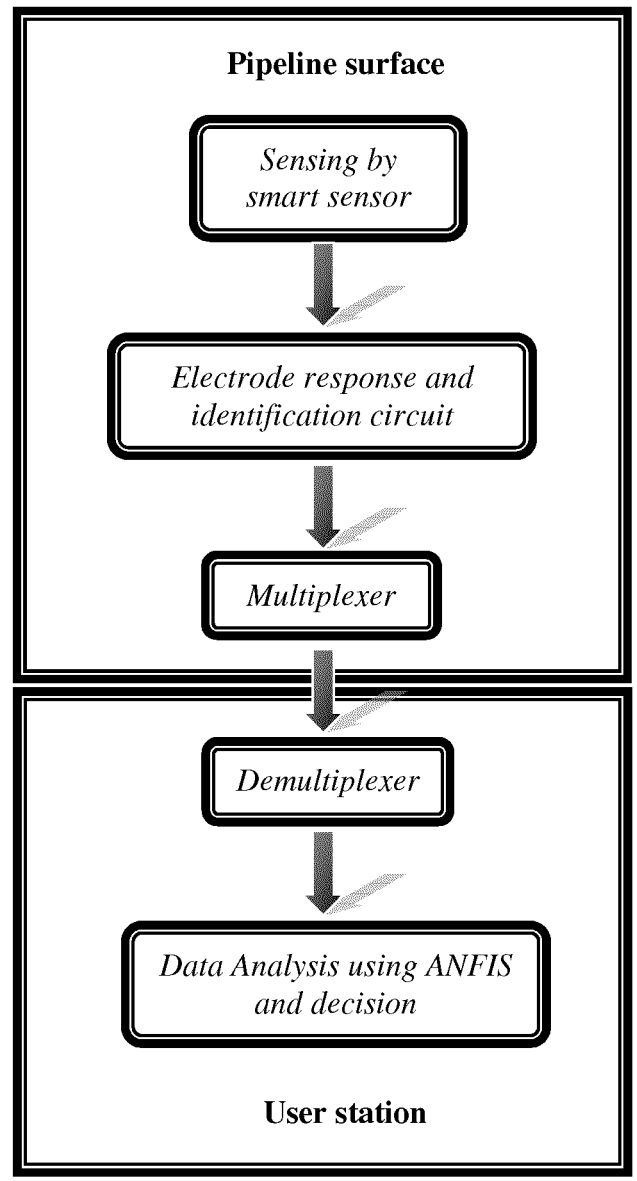
FIG. 1 is a flow chart showing system functionalities of a skin sensor system according to one embodiment of the present invention.

The description that follows and the embodiments described therein, are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

It is important in the industry to be able to pinpoint the location of a leak and/or a structural defect in structures that are used to store and/or transport hydrocarbons, since a large amount of hydrocarbons may be lost due to leaks and defects. Rapid detection of leaks and structural defects may help prevent and/or mitigate spills. Oil spills have been a major issue for the industry not only economically, but also environmentally. With increasing environmental awareness, there is a need to develop a low cost and reliable system to help protect the environment from oil spills.

The present invention aims to overcome the challenges outlined above by providing a sensor system for direct and/or active hydrocarbons leakage detection and monitoring. In one embodiment, direct and/or active detection and monitoring is accomplished by installing a smart skin, having a network of sensing elements disposed thereon, on to hydrocarbon storage and transporting structures. The present invention aims to provide an overall solution for the hydrocarbon leakage detection and monitoring system for pipelines, storage tanks and other industrial bodies containing hydrocarbons.

In one embodiment, one or more sensing elements are disposed on a sheet of material to provide a sensor skin (also sometimes referred to as "smart skin") for detecting and monitoring hydrocarbon leakage. The sensing element comprises a first polymer capable of swelling in the presence of a fluid containing hydrocarbons. The sensing element may further comprise electrically conductive carbon nanoparticles and semi-conductive metal oxide nanoparticles. The conductive carbon nanoparticles incorporated into the sensor material may include, for example, carbon nanotubes (CNTs) and graphene nanoplatelets (GNPs), both of which have excellent electrical properties.

In one embodiment, the detection of hydrocarbon leakage is performed by detecting a change of the electrical conductivity of the sensing element due to adsorption and/or absorption and desorption of the chemical species on the surface of sensing element. Further, the sensitivity of the sensing element can be tailored by incorporating metal oxide nanoparticles.

Alternatively or additionally, one or more of the sensing elements comprise a second polymer admixed with CNTs for monitoring the structural integrity of surfaces, including for example surfaces of pipelines, pressure vessels, storage tanks, and other structures for storing and/or transporting hydrocarbons. These sensing elements are sensitive to changes in the external vibration (i.e. stress or strain) and temperature, which helps to determine the dynamics of the structure. Based on the dynamics information, the failure of a structure due to corrosion and/or other external factors may be predicted and/or detected before any substantial damage to the structure.

In a preferred embodiment, the sheet of material is a flexible material, such as flexible polymer, including for example polyimide, polyethylene terephthalate (PET), polycarbonate (PC), fluorene polyester, and the like, thereby allowing the smart skin to be applied to most surfaces. In one embodiment, the sheet of material is a polyimide sheet based printed circuit board having a non-invasive electrode network system fabricated therein for electronic communication with a data acquisition system.

Figure 2:
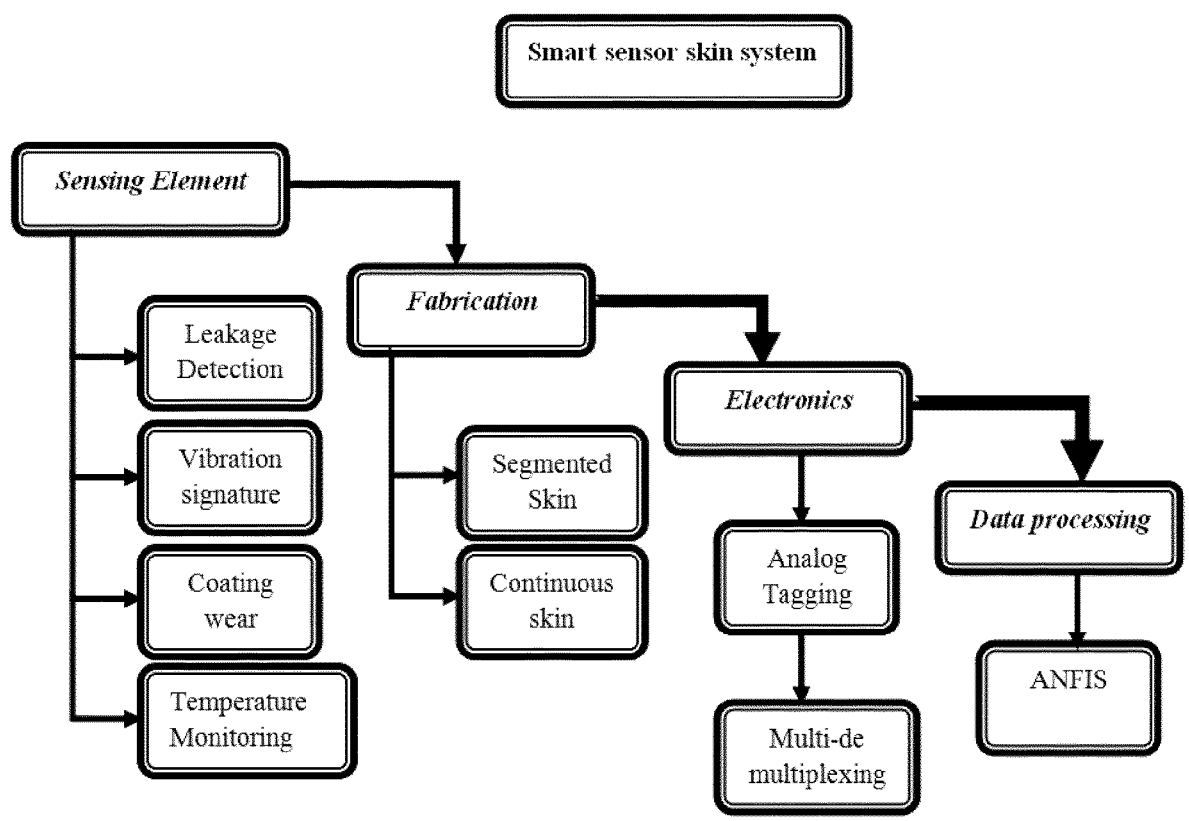
FIG. 2 is a schematic diagram showing various system components of a skin sensor system according to one embodiment of the present invention.

FIG. 2 illustrates the four main components of the sensor skin system according to one embodiment of the present invention. First, each sensing element reacts to one or more of the following stimulus: presence of hydrocarbon fluid ("leakage detection"), external stress or strain ("vibration signature"), insulating coating wear on pipeline surface, and change in the surrounding temperature. The second component is the fabrication process used to manufacture either segmented or continuous smart skin which can be employed on pipeline or other surfaces. The third component is an onboard electronic system for supporting the smart skin. The fourth component is a data processing and monitoring component that performs data analysis to capture any disturbance observed by the sensing elements on the smart skin.

a) Sensing Element

According to one embodiment, the smart skin comprises a plurality of chemical sensing elements (sometimes also referred to herein as "SE-A"), each containing a polymer admixed with electrically conductive nanoparticles and metal oxide nanoparticles. The smart skin is deployed to cover at least part of a surface, such as a pipeline outer surface. The sensing elements in the smart skin are comprised of a swellable polymer admixed with electrically conductive particles such as carbon based nanoparticles, including for example carbon fibre, graphite nano powder, carbon nanotube (CNT), and graphene nanoplatelets (GNP). In one embodiment, the SE-A contains a polymer and conductive particles, especially carbon nanotubes (CNT), exfoliated graphene nanoplatelets (xGNP), and metal oxides, in any combination exceeding the percolation threshold.

Chemical sensing elements are configured to have a great affinity towards hydrocarbons. The presence of hydrocarbons can therefore be directly detected by detecting a change in the electrical conductivity of the sensing elements resulting from the adsorption and desorption of chemical species on the surface of sensing elements. Further, the sensitivity of the sensing elements may be tailored by incorporating metal oxide nanoparticles.

SE-A comprises an admixture of conductive particles and a swellable polymer, i.e., a polymer material capable of swelling when exposed to hydrocarbon fluid. The swellable polymer has an ability to absorb and swell upon exposure to hydrocarbon without degrading or dissolving, and is hydrophobic and reversible, i.e., capable of recovering to its original size and conductivity once the hydrocarbon is removed therefrom. The swellable polymer for use with the present invention is preferably low cost and easy to process, and has low curing temperatures. Examples of suitable polymer materials include synthetic rubber, polyvinyl chloride, polymetheyacrylate, silicone based polymers, and the like. Silicone based polymers are preferred, given their water and corrosion resistant properties.

The conductive particles selected for use with the present invention preferably have excellent electrical conductivity, and are inert to hydrocarbons and to water or moisture. Examples of suitable conductive particles include gold, platinum, silver, copper, nickel, ferrite, electrically conductive carbon, and the like. Carbon based conductive particles such as carbon nanotubes and graphene nanoplatelets are preferred due to their excellent electrical conductivity. The mechanical and thermal properties of carbon nanotubes and graphene nanoplatelets may provide thermal stability and durability to the polymer in the SE-A.

In a sample embodiment, the SE-A comprises a polysiloxane copolymer (a silicone based polymer) and a plurality of nanoparticles homogeneously dispersed in the polymer using ultasonication technique. The nanoparticles comprise an equally weighted carbon nanotubes and semi conductive metal oxide nanoparticles. The SE-A shows different sensing characteristics associated with different oxide nanoparticles which may be useful in different applications.

Silicone based polymers (also referred to as "siloxane polymers") are the preferred co-monomers for the SE-A. The siloxane polymer comprises "[—SiRR'O—]" functional group with various alkyl and aryl R and R' side groups. The polysiloxane polymers are preferred as the base polymers for the SE-A due to their ability to facilitate selective sensing of chemical vapors [Huang et al. 2010].

A benefit of CNTs is their high electrical conductivity and aspect ratio, which help reduce the concentration required to achieve the percolation threshold. The percolation threshold is a critical concentration of conductive particle required in insulating the polymer to form a conductive network. Thus, a low concentration of CNTs is needed to achieve same conductivity as that of other conductive particles, which may assist in reducing fabrication and material costs [McLachlan et al. 2005]. Further, due to their tubular geometry, CNTs may facilitate the elastic deformation or buckling of the SE-A, which may improve the robustness and stability of the SE-A. CNTs have a unique nanostructure, which gives CNTs a large surface area having high electrical conductivity, and thermal and chemical inertness properties. These properties make CNTs a good choice for use in the SE-A.

The polymer film reinforced with carbon nanotubes offers a unique approach to pipeline leak detection, where the sensing mechanism is attributed to the effect on the inter-CNT conductivity from physical absorption of hydrocarbon molecules between CNTs [Li et al. 2011]. The change in the resistance in the SE-A is due to the charge transfer between chemical molecules and CNTs, which varies based on the concentration of the chemicals absorbed in the nanocomposite. The quantum mechanical tunnelling effect controls the electrical response of CNT composites. As the polymer swells upon absorption of hydrocarbons, the increased volume of the polymer increases the distance between adjacent nanotubes, thereby decreasing the chance of electron transfer. Consequently, with fewer conducting paths available, the resistance of the SE-A increases. High sensitivity and reversibility of CNTs to hydrocarbons are reported in the literature, thereby affirming the applicability of the CNT nanocomposite in detecting hydrocarbons [Li et al. 2011].

xGNP nanoparticles have a smaller size and planer structure compared to materials disclosed in the prior art. These features facilitate electron transport and increase conductivity at lower concentrations, as compared to, for example, carbon black. The xGNP also has a higher strength to weight ratio compared to carbon black, which may provide higher mechanical and thermal stability to the polymer composite. In a preferred embodiment, xGNP is used in combination with CNT and/or the other particle types in the SE-A, to help expand the range and sensitivity of the sensing element. xGNPs do not react with the polymer and/or other chemicals, but present increased sensitivity with respect to CNTs.

Additional characteristics and sensitivity of the SE-A may be achieved by incorporating metal oxides into the polymer. Metal oxides may be admixed with the CNT to impart different sensing behavior to the sensing elements depending on the intended environment in which the SE-A is to operate. Metal oxides form wide-ranging nanostructures, which may provide a larger surface area for chemical absorption and stable performance over a large range of temperatures to which the SE-A may be exposed. Examples of metal oxides that may be used with the polymer include titanium dioxide, zinc oxide, iron (III) oxide, and any combination thereof.

Alternatively or additionally, the smart skin may comprise structural monitoring sensing elements (also sometimes referred to herein as "SE-B") that contain CNTs admixed with other hydrophobic and oleophobic polymers that are capable of monitoring the structural health of the pipeline and other devices. In one embodiment, SE-B comprises a thermoplastic polymer admixed with CNTs homogeneously dispersed using ultrasonication. The CNTs form a conductive network inside the polymer. The conductivity of this type of sensing elements is affected by external stress, external strain, and/or forces applied to the surface on which the smart skin is deployed, and changes in surrounding temperature. The structural dynamics of the pipeline including external stress/strain measurements are computed as a function of recorded changes in the electrical conductivity of the sensing elements. This may assist in predicting potential failure of the pipeline structure on or near which the smart skin is applied, as well as any external and/or internal corrosion and physical damage to the pipeline surface.

Apart from hydrocarbon sensing and structural monitoring, both types of the sensing elements (SE-A and SE-B) can be used to passively sense insulating coating wear on pipeline surface.

The present invention provides a nanoparticle-reinforced polymer coating for direct hydrocarbon leak detection and monitoring of pipelines. The two types of sensing elements, SE-A and SE-B, provide four major functions to the sensor skin, i.e.:

Direct hydrocarbon detection: the electrical conductivity of SE-A is reduced in the presence of hydrocarbons. These sensing elements may be used for direct and/or active hydrocarbon detection.

Pipeline structural monitoring: SE-B helps in monitoring the dynamics of the pipeline surface through detection of external strain/stress and force ("vibration signatures") that are applied to the pipeline structure. By monitoring dynamics of pipeline, SE-B assists in predicting pipeline structure failure that may be caused by corrosion and other factors.

Temperature sensing: SE-B is also sensitive to temperature change and, therefore, may be used to determine the temperature at which the sensor skin is operating in order to compensate for any temperature effects.

Indirect sensing of epoxy coating wear: SE-A and SE-B can provide indirect measurement of changes in the insulating coating on the pipeline surface.

b) Fabrication

Carbon nanoparticles and other nanoparticles discussed above may be admixed with swellable polymer resin in an organic solvent such as chloroform, toluene, benzene and the like to form a coating composition for the printing of the sensing elements. This coating composition is referred hereinafter as the "ink". Examples of suitable ink based fabrication processes include spray coating, silk screening, spin coating, and the like.

In one embodiment, a fabrication process using a spray coating technique comprising compressed air nozzle is developed to manufacture smart skin. In a preferred embodiment, the smart skin layer is composed of both SE-A and SE-B elements, thereby providing multi-functionality such as detecting hydrocarbon leakage, predicting structural failure of pipelines, generating patterns of hydrocarbon leakage, an locating surface coating wear on pipeline surfaces.

In additions to the favourable compositions suitable specifically to the hydrocarbon oil and gas materials that pipelines carry, a surface spray system is provided herein. The surface spray system has the capability of dynamic movements. In one embodiment, the surface spray system comprises a single nozzle for spray painting on to a target substrate and a control mechanism for nozzle and substrate stage to produce different arrangements of spray coated films.

The use of a roll-to-roll manufacturing process to incorporate the spray system for fabrication of sensing elements is also described herein. The roll-to-roll manufacturing process may provide the benefit of fabricating sensing elements in large rolls, which may be wrapped around the outer surface of a tubular structure, such as a pipeline.

Two installation methods for the sensor skin system are provided herein. The first method comprises wrapping a long roll of smart sensor skin around long pipelines. The second method comprises a smaller sensor skin system which may be deployed on an accident prone area of the pipeline.

c) Electronics

In one embodiment, the non-invasive electrode network system uses electrically conductive electrodes to support smart skin system, which is described in more detail herein below. Possible electrode materials include for example, silver, copper, gold, platinum, etc. An analog electrode tagging technique may be used for electrode identification in the sensor skin system. Such technique allows identification of the position of the sensing element electrodes in the sensor network without a large amount of electronic infrastructure.

d) Data Processing & Monitoring

An algorithm is described herein for pinpointing the location of a leakage and/or structural defect based on the signals received from various sensing elements in the sensor skin. At the leakage location, signals from the sensing elements closest to the leakage reflect higher deviation as compared to the elements that are further away. The algorithm includes multiplexing of a large number of signals coming from the sensing elements and analyzing same using an adaptive neuro-fuzzy inference system (ANFIS). The set of fuzzy rules that transform the input signals to the presence of hydrocarbon based on sensitivity parameters (i.e. hydrocarbon affinity) of the sensing elements are also described herein. In one embodiment, the location of hydrocarbon leakage is determined by detecting the relative discontinuity in the reflected signals.

In one embodiment, the ANFIS analyzes a large amount of data coming from the plurality of sensor elements. The ANFIS combines artificial neural network and fuzzy inference computer-based technologies. A fuzzy inference system consists of fuzzy rules (if-then) and based on past training defines the membership functions associated with the fuzzy sets used in fuzzy rules and infers a decision.

The ANFIS model provides ways for fusing various sensing element signals and gives the decisions under different conditions. The ANFIS algorithm is pre-trained, using a set of sensitivity factors obtained through calibration tests, to determine the sensor response and generate the set of fuzzy rules that transform the inputs, i.e. the electrical signals from the electrodes and the sensitivity parameters (i.e. hydrocarbon detection) of the sample. According to one embodiment, several electrode outputs are used to detect the condition of the specimen through the utilization of the neuro-fuzzy method. Through the use of the ANFIS algorithm, it is possible to determine the location of disturbances (e.g. presence of hydrocarbon, applied force, stress, strain, vibration, etc.) on the sensor skin The smart skin system as illustrated in FIG. 1 is divided in to various support systems. The support systems are mainly divided into two parts based on their location in the system. While smart skin comprises a network of sensing elements and a local electronic system that are deployed on a pipeline surface, the data obtained from sensing elements is preferably processed at the remote user station for monitoring the pipeline surface for possible or potential disruptions in the pipeline structure in order to predict and identify the location of the structural failure and/or hydrocarbon leakage.

EXPERIMENTS

Several experiments are performed to investigate the capabilities of the chemical sensing elements SE-A. To test the capabilities in various aspects, the following criteria have been developed:
a) How effectively the sensing element indicates the existence of hydrocarbon based on the changes in resistance or voltage, which are outputs in the electrical circuit.
b) How effectively the sensing element indicates the location of hydrocarbon based on different outputs from neighboring sensing elements.
c) The effects of different sensing elements on the capabilities of the sensor skin, including sensitivity, reversibility, retainabilityi and behavior expressed during the hydrocarbon exposure.
d) The compatibility of the sensor skin with a pipeline surface.
e) The effects of the phases of hydrocarbon (i.e. vapor and liquid) on the capabilities of the sensing elements.

To study the above criteria, experiments are divided into three main categories. Each experiment is designed to test one or more of the criteria described above. The three experiment categories are:

i. Experiments with a single-electrode sensor skin.
ii. Experiments with a nine-electrode sensor skin (i.e. vapor sensing).
iii. Experiments with a nine-electrode sensor skin on a pipeline (i.e. direct crude oil contact).

In chemical sensing elements SE-A, different compositions of sensing elements affect the abilities of the sensor skin and allow the sensor skin to be applied for various applications under different circumstances. In this case, by varying the sensing elements in the sensor skin, the sensor skin can be configured and tailored to specific applications and/or environments in the pipeline industry. To test the sensor skin for use in different applications and/or environments, experiments have been conducted with different compositions of nanoparticles mentioned above.

Experiments with a Single-Electrode Sensor Skin

The first category of experiments are designed and performed to examine the capabilities of the sensing elements. A sensor skin with a single sensing element electrode is fabricated and tested. Six compositions have been tested to show the functionality of the different nanoparticles.

Figure 3A:
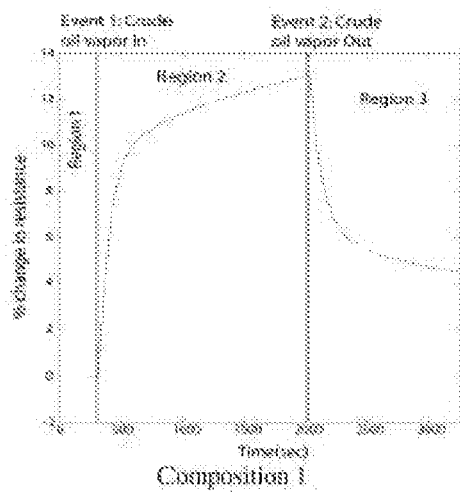
FIGS. 3a to 3f are graphical representations of resistance profiles of various compositions during crude oil vapor exposure.
Figure 3B:
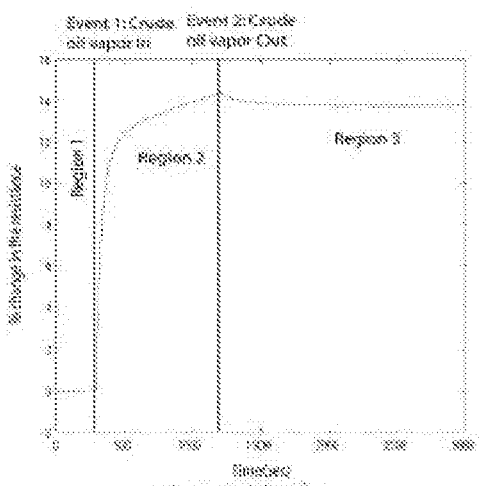
Figure 3C:
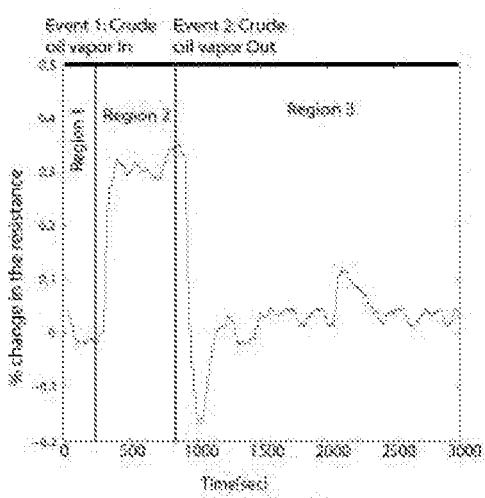
Figure 3D:
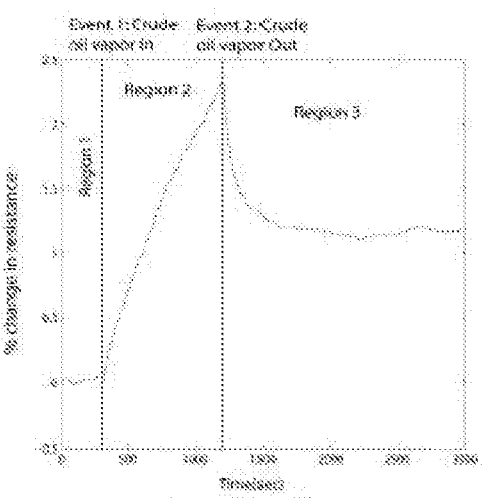
Figure 3E:
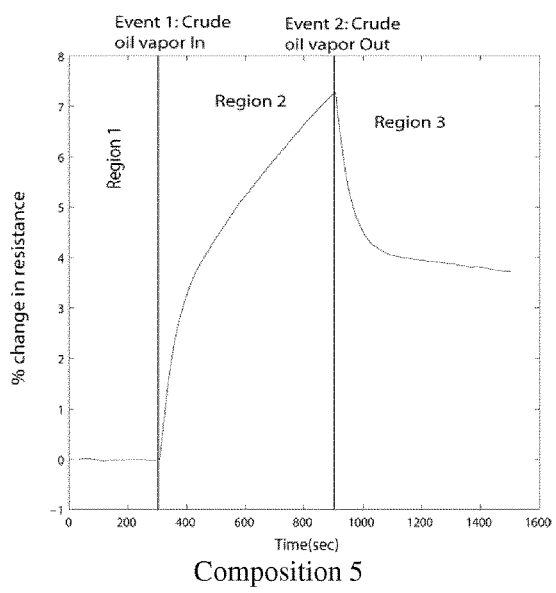
Figure 3F:
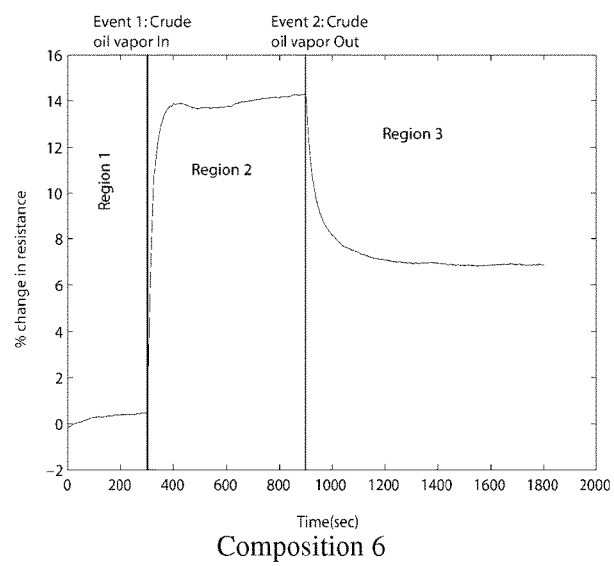

FIGS. 3a to 3f illustrate test data of various compositions for the sensing element in the sensor skin:

FIG. 3a: composition "1" comprising 90 wt. % polysiloxane copolymer and 10 wt. % multiwalled carbon nanotubes (MWCNTs);

FIG. 3b: composition "2" comprising 90 wt. % polysiloxane copolymer and 5 wt. % MWCNTs and 5 wt. % xGNPs;

FIG. 3c: composition "3" comprising 90 wt. % polysiloxane copolymer and 5 wt. % MWCNTs and 5 wt. % $TiO_2$ nanopowder;

FIG. 3d: composition "4" comprising 90 wt. % polysiloxane copolymer and 5 wt. % MWCNTs and 5 wt. % ZnO nanopowder;

FIG. 3e: composition "5" comprising 90 wt. % polysiloxane copolymer and 5 wt. % MWCNTs and 5 wt. % $Fe_2O_3$ nanopowder; and FIG. 3f: composition "6" comprising 85 wt. % of polysiloxane copolymer and 5 wt. % MWCNTs and 5 wt. % xGNPs and 5 wt. % ZnO nanopowder.

With reference to FIGS. 3a to 3f, each composition is exposed to crude oil vapor, and the percentage change in its resistance is recorded before, during, and after the exposure. The resistance profiles during the test can be divided into three regions. The first region ("Region 1") is the percentage change in the resistance before the exposure. "Event 1" indicates the moment at which crude oil vapours are introduced to the sensing element. As soon as the sensing element comes into contact with the crude oil vapour, its resistance changed substantially instantaneously. This indicates the sensitivity of the sensing element. The second region ("Region 2") indicates the time interval during which the sensing element is kept in contact with the crude oil vapor. The percentage change in resistance observed in this region indicates the affinity of the sensing materials to hydrocarbons. "Event 2" represents the removal of the crude oil vapour from the sensing element, at which point the percentage change in resistance drops. In the third region ("Region 3"), the resistance of sensing element strives to return to its normal (i.e. pre-hydrocarbon exposure) state. The study of Region 3 provides some information on the reversibility and/or retainability of the nanoparticle composition used in the sensing elements.

The data indicates that a polymer admixed with a mixture of carbon nanoparticulates has the most hydrocarbon sensitivity when the sensing element is exposed the crude oil vapor. For example, with reference to FIG. 3b, composition 2 shows a substantially instantaneous increase of approximately 11% in the resistance of the element. Composition 2 also shows high retainability in Region 3, after the sensing element is removed from hydrocarbon exposure. A high retainability may be useful for "finger printing" (i.e. pin-pointing) the hydrocarbon leakage, even after the leak has stopped.

With reference to FIGS. 3c, 3d, and 3e, the data shows that the sensing elements containing the mixture of MWCNTs and metal oxides (i.e. compositions 3, 4 and 5) are less sensitive to hydrocarbon exposure but they show different characteristics than the sensing elements fabricated exclusively with carbon based nanoparticles. For example, with reference to FIG. 3c, the sensing element comprising $TiO_2$ nanoparticles (i.e. composition 3) shows steady behavior during all three regions and a close to perfect reversibility. In the case of polymers comprising ZnO and $Fe_2O_3$ nanoparticles (i.e. compositions 4 and 5, and FIGS. 3d and 3e, respectively), the sensing elements show a rapid substantially linear increase in resistance during hydrocarbon exposure (i.e. Region 2). This type of data pattern of change in resistance may serve as a continuous warning signal for hydrocarbon leakage.

Table 1 below provides a comparison between the hydrocarbon sensing properties of the sensing elements comprising the different compositions mentioned above.

TABLE 1

Hydrocarbon sensing characteristics of different compositions

| Composition | Event 1 Sensitivity to the exposure | Region 2 Behavior during exposure | Event 2 Sensitivity towards removal of exposure | Region 3 Behavior after exposure |
|---|---|---|---|---|
| 1 | High | Low (Increasing smoothly) | High | Medium Reversibility |
| 2 | Very High | Low (Increasing smoothly) | High | Low Reversibility |
| 3 | Very Low | Stable (Constant) | Very Low | Very high Reversibility |
| 4 | Very Low | Linearly increasing (High) | Very Low | High Reversibility |
| 5 | Low | Linearly increasing (Very High) | Medium | Medium Reversibility |
| 6 | Very High | Low (Increasing smoothly) | High | Medium Reversibility |

The data shows that various sensing elements comprising different nanoparticles may be used for hydrocarbon detection. Further, the sensing elements display a substantially immediate response (i.e. an increase in resistance) to the presence of crude oil vapour, when the elements are in the vicinity of crude oil. Therefore, the data suggest that direct contact with crude oil is not necessary for hydrocarbon detection and that the sensing elements are capable of detecting even a very small amount of hydrocarbon leakage, almost instantaneously.

The response sensitivity towards hydrocarbons can be altered by varying the size and/or surface area of the sensing elements as size and/or surface area affects the electrical conductivity of the sensing elements. An increase in size decreases the resistance of the sensing elements, which improves the percentage sensitivity in the sensing elements' response.

The single sensing elements have also been tested with various liquid hydrocarbon products that the pipelines may carry. Such hydrocarbon products comprise mainly bitumen mixed with diluents to facilitate transportation. The diluents are generally low viscosity hydrocarbons such as pentane, hexane, octane, etc. The sensing elements are tested by exposing them to small amounts of the liquid hydrocarbon products. Table 2 below shows the sensitivity of each composition towards the diluents after 10 seconds of exposure. The data in Table 2 suggests that the abovementioned compositions are highly sensitive and react quickly to the diluents. Table 3 below shows the sensitivity of the different compositions to the diluted bitumen after one minute of 100 µL of exposure.

TABLE 2

Response to diluents of various compositions

| Hydrocarbon | Composition | % resistance change after 10 seconds upon exposure of 100 µL |
|---|---|---|
| Pentane | 1 | 384.74 |
|  | 2 | 247.14 |
|  | 3 | 112.46 |
|  | 4 | 239.36 |
|  | 5 | 242.75 |
|  | 6 | 602.89 |
| Hexane | 1 | 1186.04 |
|  | 2 | 1604.57 |
|  | 3 | 358.51 |
|  | 4 | 745.18 |
|  | 5 | 409.66 |
|  | 6 | 474.11 |
| Octane | 1 | 206.571 |
|  | 2 | 143.21 |
|  | 3 | 127.79 |
|  | 4 | 169.07 |
|  | 5 | 204.03 |
|  | 6 | 462.37 |

TABLE 3

Response to diluted bitumen of various compositions

| Hydrocarbon | Composition | % resistance change after 60 seconds upon exposure of 100 µL |
|---|---|---|
| Crude oil (1 part bitumen + 1 part pentane) | 1 | 28.73 |
|  | 2 | 22.10 |
|  | 3 | 11.53 |
|  | 4 | 15.99 |
|  | 5 | 12.15 |
|  | 6 | 27.96 |

Figure 4:
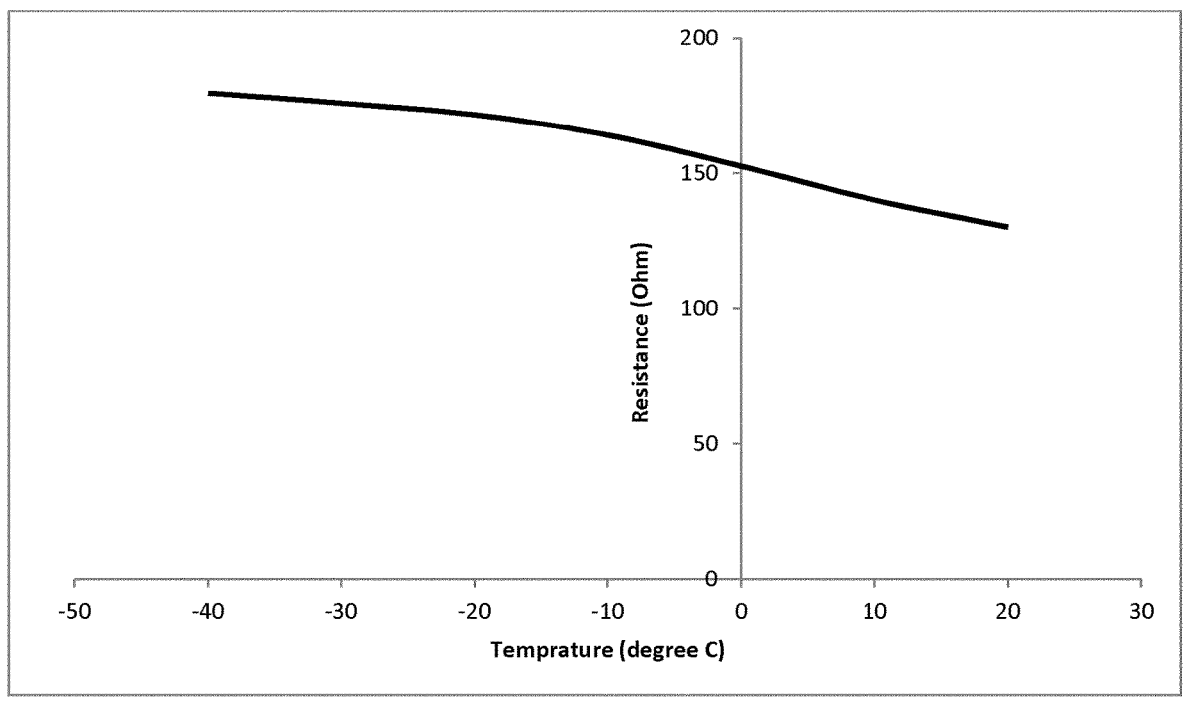
FIG. 4 is a graphical representation of resistance change with respect to temperature of a sensing element comprising 90 wt. % polysiloxane copolymer and 10 wt. % multiwalled carbon nanotubes.

The single sensing elements have also been tested against temperature, in the absence of hydrocarbons. FIG. 4 illustrates that the resistance of sensing elements made up of composition 1 can be affected by temperature change. In general, resistance decreases as temperature increases.

Figure 5A:
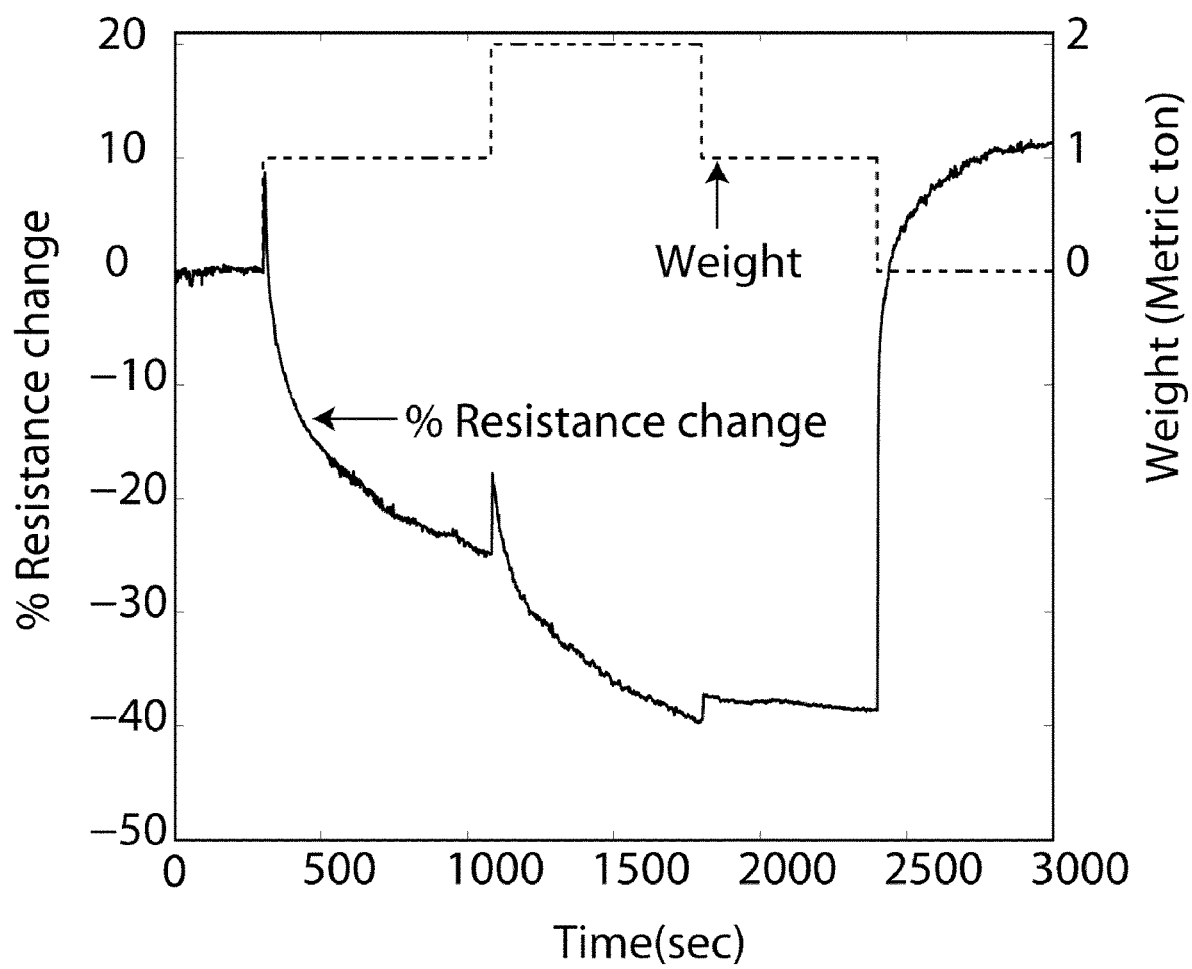
FIGS. 5a and 5b are graphical representations of resistance change with respect to pressure on the sensing element of FIG. 4.
Figure 5B:
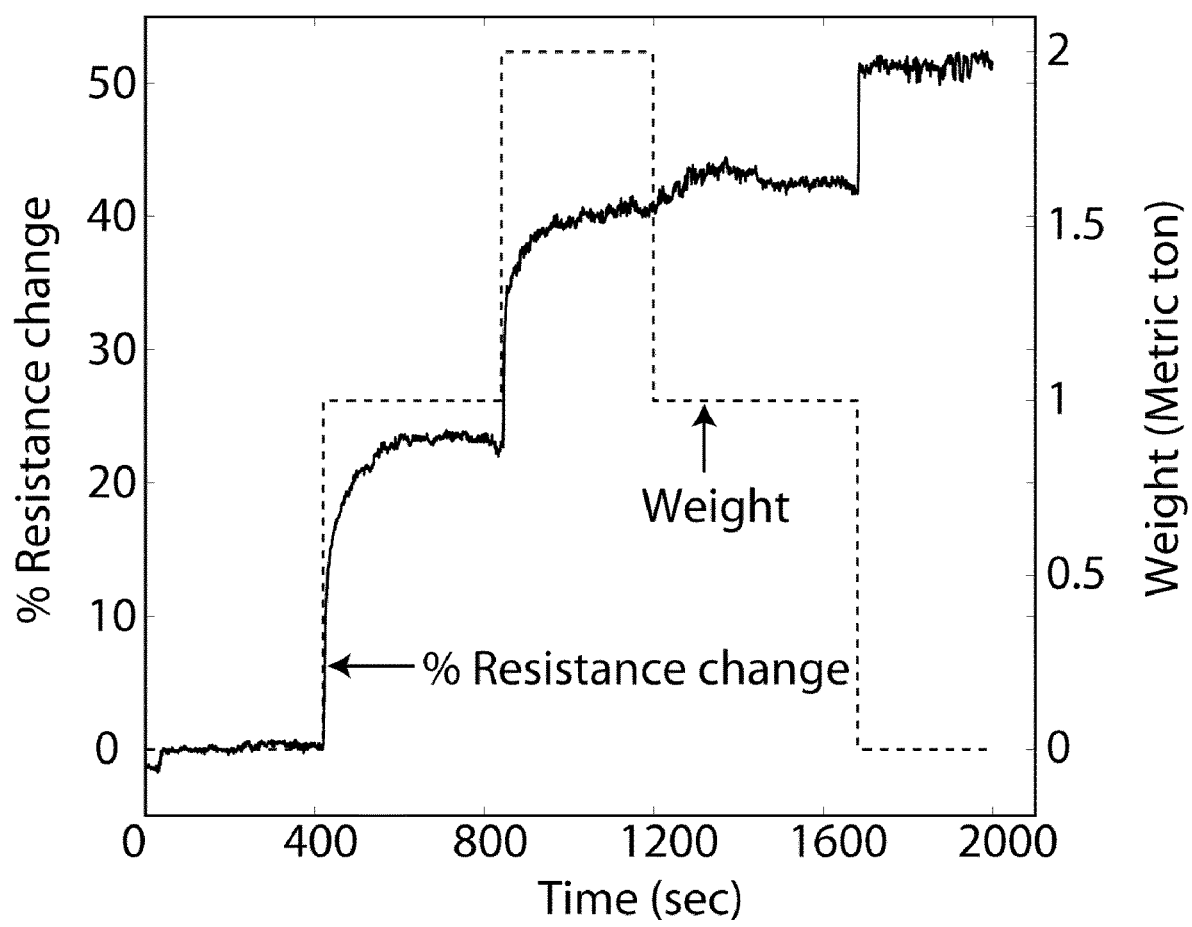

With reference to FIGS. 5a and 5b, single sensing elements made up of composition 1 have been tested under various pressure conditions. As most pipelines are buried underground with high compaction, sensing elements can preferably withstand and operate under high pressure conditions. A hydraulic press is used to apply pressure on the sensing elements to emulate soil compaction and data is collected therefrom. FIGS. 5a and 5b illustrate the effect of soil compaction on the resistance of the sensing elements.

A sensing element is pressurized in the absence of hydrocarbons (FIG. 5a) and compared with a sensing element having the same composition under similar compaction but in the presence of hydrocarbons (FIG. 5b), to help understand the hydrocarbon sensing ability of the sensing element under high compaction. The collected data shows that, in the absence of hydrocarbons, the resistance of the sensing element decreases with applied pressure. With reference to FIG. 5a, a 1 metric ton compaction reduces the resistance of the sensing element by about 25%, while 2 metric ton compaction decreases the resistance by about 45% from its original value. However, with reference to FIG. 5b, in the presence of hydrocarbons, the sensing element shows increases in resistance as high compaction is applied. For example, a 1 metric ton compaction on the sensing element in soil containing trace amounts of hydrocarbons shows an increase in resistance by approximately 23%, and a 2 ton compaction with similar trace amounts of hydrocarbons shows an increase of about 40%. This test suggests that sensing elements of the present invention are well suited for use with underground pipelines and hydrocarbon storage tanks.

Further, the sensing elements are tested for their stability over long time periods. Each sensing element is kept on (i.e. with current passing therethrough) for more than three months, and the change in its resistance is observed. The sensing elements show a maximum of approximately 3% variation in resistance over the time period. This test suggests that the sensing elements of the present invention have good stability and are reliable over a long period of time.

The various tests on the abovementioned single sensing elements show that the elements are sensitive to the presence of hydrocarbons and are able to detect trace amounts of hydrocarbon whether in air or soil. The sensing elements are also capable of functioning under varying temperatures and compacted soil. They also show sufficient stability over long periods of time.

These characteristics make the sensing elements of the present invention suitable for a variety of applications, including pipelines, storage tanks, and other industrial structures for hydrocarbons.

Experiments with Nine-Electrode Sensor Skin (Vapor Sensing)

Figure 6:
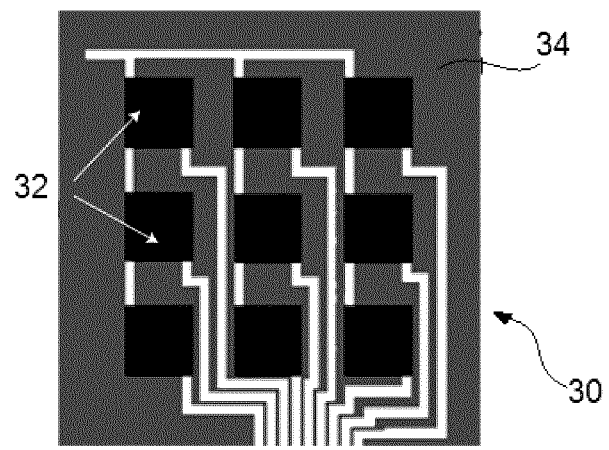
FIG. 6 is a schematic diagram of a sensor system according to a sample embodiment of the present invention.
Figure 7:
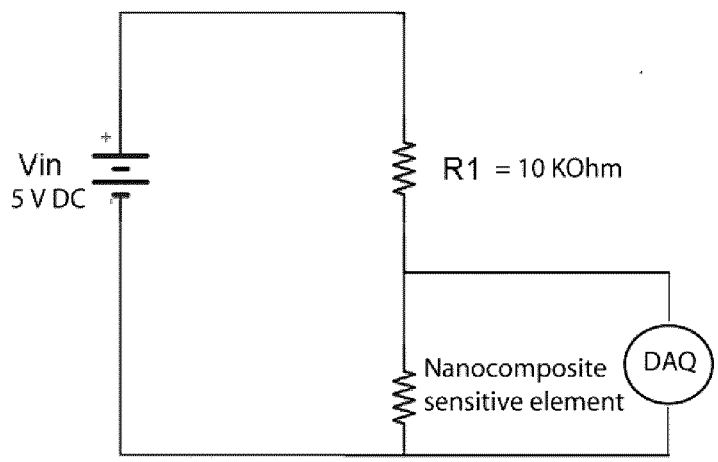
FIG. 7 is a schematic diagram of a voltage drop circuit usable for processing electrical signals from the sensor system of FIG. 6.

As pipeline leakages may happen at almost any location along a pipeline, it is desirable to use a multi-array and/or network of sensing elements electrodes that can cover all or at least a portion of the pipeline outer surface. With reference to FIG. 6, to test the characteristics of a sensing element electrode network, a sensor skin 30 with nine interdigitated array ("IDA") sensing element electrodes 32 are fabricated on a polyimide sheet substrate 34. For the experiments, the sensor skin has a size of approximately 6 cm×6 cm. The electronics interfacing the sensor skin is an electronic circuit that uses the voltage drop method as shown in FIG. 7. The responses from each sensing element electrode in the sensor skin are collected using a DAQ (Data Acquisition System). An additional current-limiting resistor (10 k$\Omega$) is placed in series to each sensing element electrode of the sensor skin.

It is desirable to be able to locate a leakage of on a pipeline surface. For testing purposes and with reference to FIG. 8, each sensing element electrode is provided with a coordinate, such as (1,1), (1,2), (1,3), etc. For the experiments, each electrode is about 10 mm×10 mm. Composition 1, mentioned above, is spray coated atop the substrate 34. Afterwards, electrode (3,3) is exposed to crude oil vapor.

With reference to FIG. 9, this experiment shows that the electrode voltage of an electrode increases as soon as the electrode is exposed to crude oil. When crude oil is placed near electrode (3,3), the voltage at electrode (3,3) shows the largest increase in voltage while the voltage at the surrounding electrodes, i.e. electrodes (3,2), (3,1), (2,3), (2,2) and (2,1), increases slowly and the voltage at more distant electrodes, i.e. electrodes (1,3), (1,2), and (1,1), does not change. FIG. 9b shows that 14 minutes after electrode (3,3) is exposed to the crude oil vapor, the voltage peaked at a relative voltage of 7 mV. Since the highest voltage value is at or nearest the location of crude oil, a network of sensing elements is useful in determining the location of a hydrocarbon leakage.

Further, as shown in FIG. 9, the distribution of voltage values is substantially directly proportional to the distance from the location of crude oil. This helps pinpoint the location of a hydrocarbon leakages of even when there is no electrode at the exact location of the leak.

Another characteristic of the sensor skin is its reversibility. The reversibility of the sensor can be observed by measuring the time it takes for the resistance or voltage of the sensor to revert back to its normal (i.e. pre-hydrocarbon exposure) values after the hydrocarbon source has been removed. With reference to FIG. 9c, it is shown that the sensor skin is able to return to its normal voltage values in a short time period once the crude oil has been removed. FIG. 9b illustrates the voltage change of the sensor skin immediately before the crude oil has been removed, and FIG. 9c illustrate the voltage change of the sensor skin approximately 15 min after the crude oil has been removed. More specifically, FIG. 9c shows approximately a 60% decrease in voltage at electrode (3,3) compared to that in FIG. 9b.

With reference to FIGS. 8, 10a, and 10b, composition 2 is used to fabricate a sensor skin having nine sensing element electrodes. The sensor skin is exposed to crude oil vapor near electrode (1,1) at 5 min from the start, when the observation in the change in voltage begins. The sensor skin is exposed to the crude oil vapour for a 10 min duration, and the crude oil vapour source is removed from the sensor skin thereafter. After the vapours source has been removed, data is collected until 50 min from the start. It can be seen that the voltage values at electrodes (1,1) and (1,2) increase the most, while some voltage increases are observed at electrodes (1,3), (2,1), (2,2) and (2,3). Almost no voltage changes are seen in the remaining electrodes.

With respect to hydrocarbon sensitivity, sensing elements containing composition 2 show similar characteristics as those containing composition 1. The experiments suggest that both compositions react to the presence of hydrocarbons by increases in voltage, the magnitude of which is substantially proportional to the proximity to the hydrocarbon source. However, the addition of xGNP to the polymer nanocomposite gives the sensing element different characteristics in terms of sensitivity and retainability. For example, composition 2 shows a maximum change of 15 mV after 10 minutes of hydrocarbon exposure, while composition 1 shows a maximum change of 7 mV after 15 minutes of exposure. This suggests that the composition with GNP has higher sensitivity toward crude oil and takes less time to achieve higher voltage differences. The sensor skin containing GNP also exhibits higher retainability. As shown in FIG. 10b, 34 minutes after the hydrocarbon source is removed, the sensor skin with GNP still retains most of the voltage values observed immediately before the removal of the hydrocarbon source (i.e. around 14 min). With a higher retainability, the sensor skin with GNP may be used to trace sources of leakage, even after the leakage has stopped. While the sensing element with only CNT has high reversibility and may be used to almost instantaneously indicate the intensity of voltage changes relative to the ground voltage at a leakage point, the sensing element with a combination of CNT and GNP tends to retain increased voltage values for a longer period of time and may therefore be used to show a history of leakage of a specific area.

Experiments with Nine-Electrode Sensor Skin on a Pipe (Direct Crude Oil Contact)

For leakage detection, it is desirable to place the sensor skin directly on to the pipeline outer surface above the insulating coating layer of the pipeline. With reference to FIG. 11, a small polymer pipe 40 comprising insulating material, i.e. acrylonitrile butadiene styrene (ABS), having a length of about 15 cm is used for the experiments. A sensor skin 30 having nine sensing elements made of composition 1 is wrapped around the outer surface of the pipe.

To simulate a small hydrocarbon leakage, a hole with a diameter of approximately 1 mm is drilled on one side of the pipe covered by at least a portion of the sensor skin. After collecting data of the initial voltage values of the sensor skin for 5 min, crude oil H is poured into the pipe. After that, the voltage changes of the sensor skin resulting from the leakage of hydrocarbon through the hole are observed.

Figure 11A:
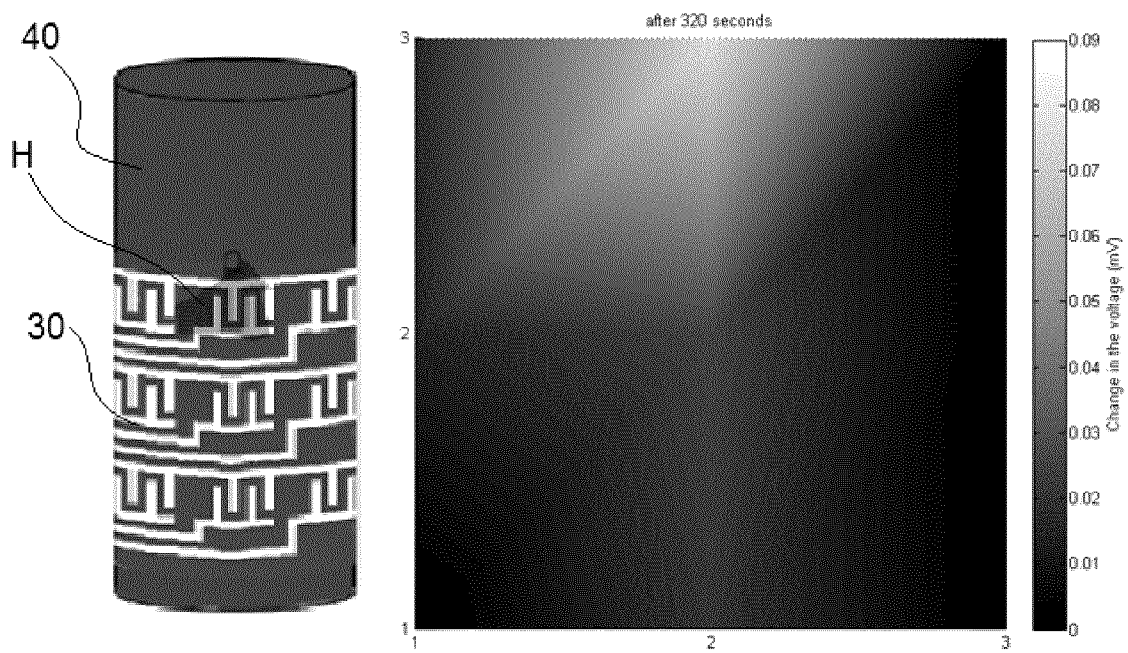
FIGS. 11a and 11b are exemplary voltage change maps from a hydrocarbon oil detection experiment on pipe after (a) 320 seconds, and (b) 340 seconds since the recording has started.
Figure 11B:
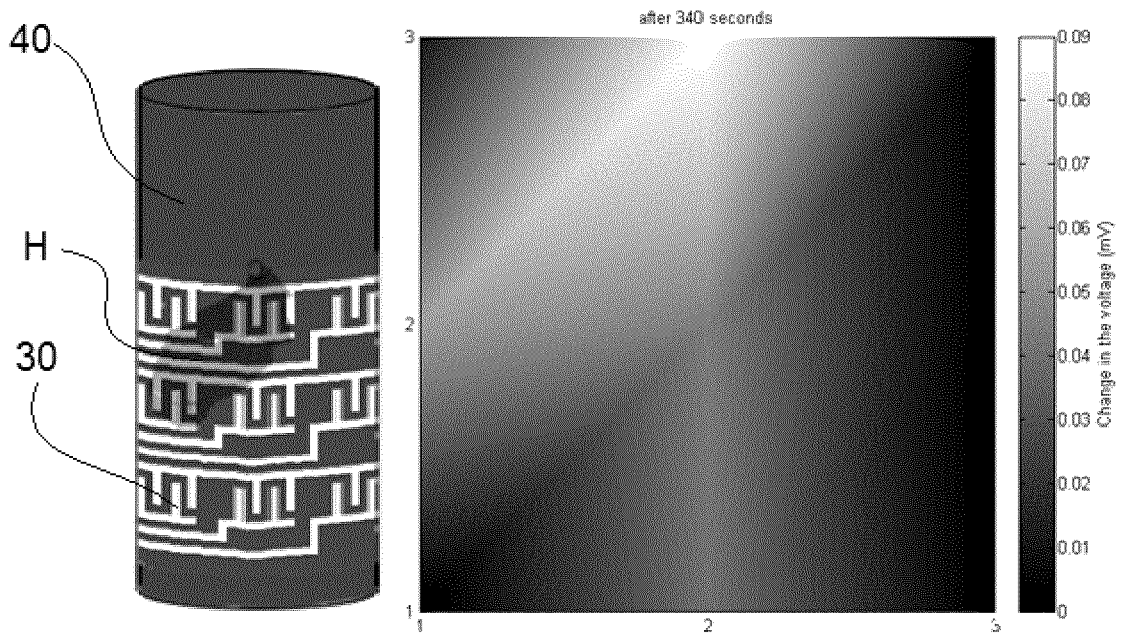

As shown in FIGS. 11a and 11b, at least a part of the sensor skin comes into direct contact with the liquid hydrocarbon oil H as the oil leaks out of the hole. As more oil seeps through the hole, the sensitivity of the sensor increases substantially. As a result, a part of the sensor skin shows about 90 mV of voltage increase within about 20 seconds, which suggests that direct contact with hydrocarbon liquid can result in sensitivity about 50 times that of exposure to hydrocarbon vapour. After about 40 seconds from the start of the leak, a larger area of the sensor skin shows an increase in voltage. Therefore, the flow pattern of the leaked hydrocarbon oil can be observed on the voltage map over time, which may help pinpoint the exact location of the leak on the pipe.

Pipeline Structural Health Monitoring

The SE-B of the present invention comprises a thermoplastic polymer, such as for example polycarbonate (PC), polystyrene (PS), and polyvinylidene fluoride (PVDF), etc. and conductive particles, such as for example carbon nanotubes and the like. SE-B may be used in a pipeline monitoring system to predict pipeline surface failures such as corrosion and indirect leakage. The vibration signature of the pipeline structure, caused by externally applied stress, strain, and forces, changes as the pipeline structure ages and deteriorates. The variation in the dynamic parameters (e.g. vibration signatures) is used to predict the location of corrosion and/or leakage in the pipeline system.

A conductive CNT/polymer filler composite is formed when the concentration of CNTs reaches a critical value, which is known as the "percolation threshold". As external strain, stress and/or forces are applied to the conductive filler composite, it contributes to the breakup of the network between the fillers and increases the inter-filler distance, which promotes a tunneling effect that increases the resistivity of the composite. It has been established that CNTs embedded in a polymer can be used as potential strain sensors using the piezoresistive behavior of composites [Zhang et al. 2006].

Figure 12:
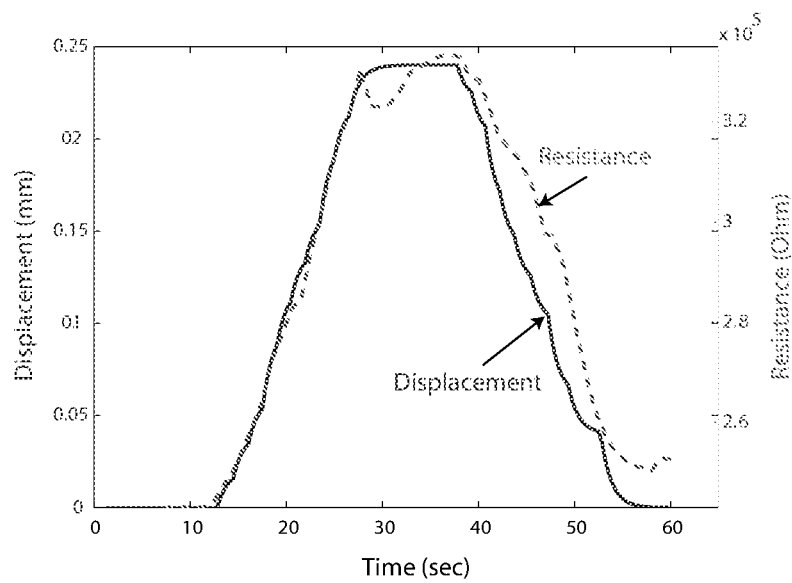
FIG. 12 is a resistance profile obtained by strain sensing of a nanocomposite coating.

With reference to FIG. 12, the strain sensing capability of SE-B is tested using a tensile tester (ESM301L). The changes in the resistance of the composite specimen are recorded during the tensile tests using a resistance meter (i.e. Biologic SP 150). FIG. 12 illustrates the change in resistance measured across the electrodes of a composite comprising 10-wt. % MWCNT/PS nanocomposite sensing elements when subject to a constant strain rate. During the experiment, the sensing elements are pulled to a maximum displacement of about 0.24 mm at a strain rate of 1 mm/minute. The specimen is held at the maximum displacement for 10 seconds and allowed to return to its original state at the same rate. FIG. 12 shows that, when strain is applied, the resistance profile substantially follows the same trend as the displacement profile of the specimen. The strain sensitivity of the specimen is evaluated by computing the gauge factor. The 10-wt. % MWCNT/PS sensing element coating shows a gauge factor of about 2.55.

It can be seen from the experimental data that SE-B has a high affinity towards applied stress, strain, and/or force sensitivity. The vibration signature (i.e. response to external stress, strain and/or force) of the pipeline structure varies with changes to the pipeline structure. SE-B responds to any changes in the vibration signature of the pipeline, which may be a result of physical changes in the pipeline such as, for example, internal and/or external corrosion to the pipeline surface. SE-B may also be sensitive towards changes in the vibration signature of the pipeline resulting from any structural damage to the pipeline, which may be caused by vandalism, weather, wear and tear, natural disaster, etc.

Temperature Sensing

Apart from sensing changes in the vibration signature of the pipeline structure, SE-B may also be used to measure the surrounding temperature of the pipeline. An increase in the resistance of SE-B is attributed to the tunnelling effect, whereby electrons are transported from CNT to CNT inside the polymer. An increase in temperature results in an increase in the tunnelling distances between two adjacent CNTs, thereby causing an increase in resistance of the sensing element.

Figure 13:
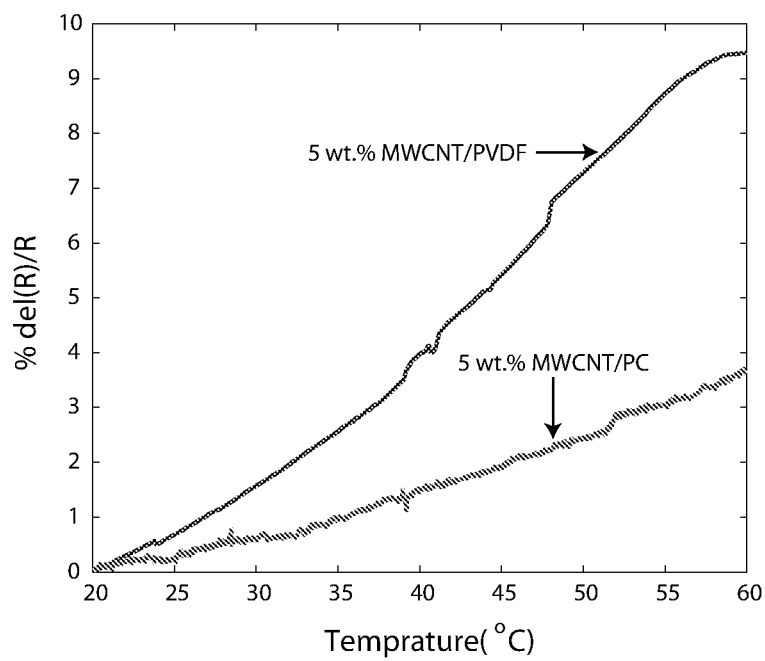
FIG. 13 is a graphical representation of the percent change in resistance versus temperature obtained during testing of a nanocomposite coating.

With reference to FIG. 13, SE-B specimens are tested for temperature dependence by exposure to heat treatment, and the resulting change in resistance of the specimens is recorded. Two injection moulded nanocomposites for the SE-B are tested: 5 wt. % MWCNT/PVDF and 5 wt. % MWCNT/PC. It can be seen in FIG. 13 that the resistance of the PC and PVDF nanocomposites increases with increasing temperature. The MWCNT/PVDF nanocomposite shows an increase in resistance close to 9% when the temperature is increased from room temperature to about 60° C. For the same temperature change, the resistance of the MWCNT/PC nanocomposite specimen increases by about 3%. The temperature dependence of the electrical conductivity characteristic of the SE-B may be used to design sensitive temperature sensors. The surrounding temperature may be accounted for to compensate for temperature effects on the sensing elements of the smart skin.

Pipeline Coating Wear

In general, the outer surfaces of steel pipes carrying liquid and gas hydrocarbons are coated with an insulating coating comprising anti-corrosive layers of insulating materials such as epoxy. The smart skin may be wrapped over the insulating coating, thereby placing its sensing elements in physical contact with the insulating coating. The placement of the sensing elements on the insulating coating allows indirect monitoring of the coating. More specifically, if coating wears off at a particular location, the sensing elements at that location are then in direct contact with conductive steel surface of the pipeline, which causes disruptions in the response of the sensing elements, thereby indicating the location of the pipeline coating wear.

Fabrication

In additions to the abovementioned compositions suitable for detecting the presence of hydrocarbon products commonly carried by pipelines, a spray system capable of dynamic movements for fabricating the sensor skin is also provided herein. The surface spray system comprises a single nozzle for spray painting composition ink on to a target substrate and a control mechanism for controlling the nozzle and substrate stage to produce different arrangements of sensing elements on the sensor skin.

In a further embodiment, the spray system comprises a plurality of inks of different or the same compositions. For example, a first ink of the spray system comprises a swellable polymer and a plurality of nanoparticles distributed within the polymer. The first ink is for fabricating SE-A. A second ink and a third ink each comprises thermoplastic polymer admixed with carbon nanotubes. In one embodiment, the second ink comprises 5 wt. % MWCNT/PVDF and the third ink comprises 5 wt. % MWCNT/PC. The sensing elements (i.e. SE-B) fabricated using the second or third ink have a higher sensitivity towards stress, strain, and/or force (i.e. changes in vibration signature), and surrounding temperature. A fourth ink is for spraying an insulating layer around the nanocomposite sensing elements SE-A and SE-B.

A roll-to-roll manufacturing process is also provided herein. The process incorporates the spray system for fabricating the sensing elements on the substrate. The process may allow fabrication of sensing elements in large rolls that can be wrapped around large sections of the pipeline outer surface.

Two installation techniques for the sensor system are provided herein. The first technique comprises wrapping a long continuous roll of sensor skin around a length of pipes. The second technique comprises applying a smaller sensor skin on specific areas of a pipeline.

Fabrication of a Large Area Sensor Skin

With reference to FIGS. 14 and 15, a system and a method of spray coating to dispose a network of nanocomposite sensing elements at specific locations on an outsized substrate to produce a sensor skin are described herein. In one embodiment, the system 50 comprises a computer controlled dynamically movable three axis stages 52, 53 and a nozzle 54 in communication with at least one ink source 56.

In the spray coating system 50, there are a number of adjustable parameters including for example ink flow rate, nozzle diameter, geometry of atomizers, and various liquid ink parameters (i.e. liquid dynamic viscosity (μ), liquid density (ρ), and liquid surface tension (σ)) that can affect the performance of the system.

To obtain substantially homogenous distribution of various nanoparticles inside the polymer, the polymer and CNTs are dissolved into an organic solvent, such as chloroform, and the resulting solution is ultrasonicated for about half an hour. A substantially uniform dispersion of nanoparticles in the polymer gives the composite consistent electric properties in all the direction. In one embodiment, the solvent is added into the polymer until the viscosity of the mixture is around 30-50 cSt., which is the preferred range for spray painting through a compressed air nozzle.

FIG. 14 shows a sample spray system for spraying up to four inks in the spraying process. In a sample embodiment, a first ink 56*a* comprises a nanocomposite ink with a high degree of sensitivity towards hydrocarbon fluids. A second ink 56*b* comprises a composition with high sensitivity towards strain, stress, and/or force (i.e. vibration signature). A third ink 56*c* comprises a composition that is sensitive to surrounding temperature. A fourth ink 56*d* comprises a composition for providing an insulating layer around the nanocomposite sensing elements formed on the substrate 34. The system 50 may be used to produce a sensor skin that can detect the presence of hydrocarbons and/or monitor the structural integrity of a structure, depending on the type of ink selected for its sensing elements.

The mixture of polymer and nanoparticulates in the chloroform solvent may be spray painted using spray coating system shown in FIG. 14 or the like. The sensor skin preferably has a thickness less than 100 μm, and more preferably between about 30 and about 50 μm, and has substantially uniform thickness throughout.

In one embodiment, the nozzle of the spray system focuses on one point ("focal point"). The performance of the spray nozzle depends on two parameters: focus length $L_g$ and focus diameter. Focus length is the distance between the nozzle and the focal point, while focus diameter is the spray diameter at the focal point. Beyond the focal length, the ink diverges based on the rate at which the ink is being released from the nozzle. Thus, it is important to determine the location of the focal point and area to be covered by experimentation so as to ensure uniform dispersion and thickness throughout the substrate. The focus diameter is preferably as small as possible, depending on variables such as air pressure and ink viscosity. The focus diameter, for example, is preferably between about 2 mm to about 5 mm, to help ensure substantial uniform thickness on the substrate. Optimum values for the focus length and focus diameter, which may depend on the viscosity of the ink, may be determined through routine experimentation.

In one embodiment, liquid polymeric nanocomposite ("nano ink") is provided in a glass bottle and the nano ink is siphoned through a tube into an airbrush assembly 58, where the ink is atomized into fine droplets. The ink is delivered to the nozzle via a delivery line 60. Further, pressurized air A enters into the nozzle 54 from a pressure inlet 62, thereby increasing the pressure inside the nozzle. The increase in pressure is accompanied by the atomization of the ink, which causes the ink to exit through the nozzle. In a sample embodiment, the distance between the nozzle and the substrate (i.e., the spray distance) is adjustable via stage 53.

The spray system further comprises a drive system for controlling various parameters such as the three dimensional movement of the nozzle 54, the mass flow rate of the ink coming out from the nozzle, and the spray stroke. These parameters are adjusted based on the type of ink and printing patterns. The drive system may be manually controlled or computer automated.

The spray system is controlled by a computer system. Stages 52 and 53 provide the system with three degrees of freedom. Stage 52, where the substrate is to be placed for spraying, has two degrees of freedom on a plane, which in one embodiment may be substantially horizontal, and stage 52 is movable in the x and y directions on the plane. The nozzle 54 is attached to stage 53, which movable in a direction z substantially orthogonal to the plane of stage 52, thereby allowing adjustment of the distance between nozzle and the open surface of the substrate.

The computer system also controls a solenoid valve 64 which in turn controls the dwelling time and spraying time of the nozzle. As shown for example in FIG. 14, the system may use a plurality of inks to fabricate the sensor skin such that the skin includes nanocomposite elements with different functionalities. In other words, the sensor skin may include both SE-A and SE-B elements. In one embodiment, each row of the network of sensing elements alternates between SE-A and SE-B. In another embodiment, the sensor skin has alternating rows of SE-A and SE-B. Of course, other sensing element patterns and/or configurations on the sensor skin are possible. The computer system controls which ink (i.e. which nanocomposite) is sprayed on to a particular location of the substrate.

Figure 14:
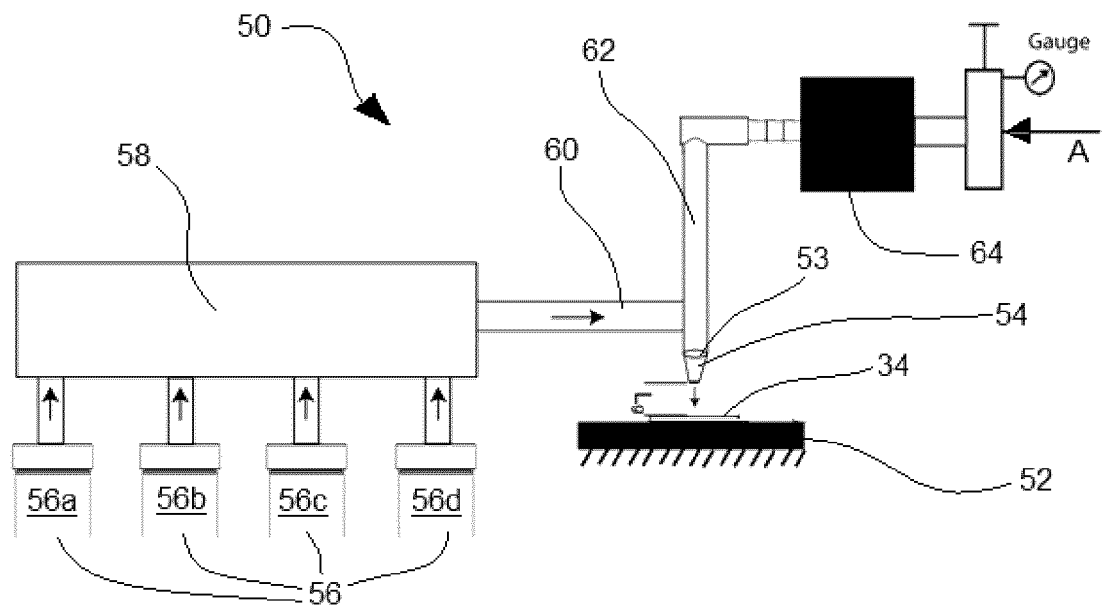
FIG. 14 is a schematic diagram of a spray coating system usable to deposit sensor materials according to one embodiment of the present invention.
Figure 15:
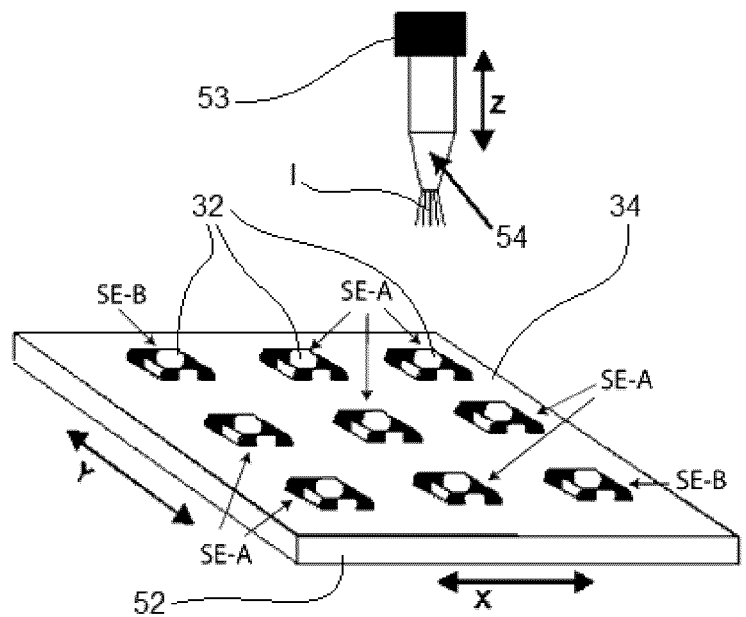
FIG. 15 is a perspective view of the spray coating system of FIG. 14 in operation.

The spray coating system shown in the FIGS. 14 and 15 may be incorporated into a roll-to-roll manufacturing process. The roll-to-roll manufacturing process can be used for spray coating flexible substrates such as a polyimide sheet. The process can be used to generate sensing element patterns on large surface areas.

The roll-to-roll process can deposit large numbers of nanocomposite elements on a polyimide substrate. It can also control the thickness and geometry of the nanocomposite elements, thereby allowing any desired configuration of the sensing element to be produced. Further, the computer-controlled system may allow the process to be carried out accurately and efficiently.

Electronics

The sensing elements in the sensor skin of the present invention are connected to an electrode network. In one embodiment, the electrode network is printed using electrically conductive silver ink.

An analog tagging process may be used for electrode identification for the sensor system of the present invention. The analog tagging process is based on a voltage divide circuit and the voltage responses coming from each electrode, which are used to identify the position of the electrode in the sensor network. In one embodiment, a multiplexer microswitch is used to read the responses coming from the sensing element electrodes to overcome the extensive wiring associated with a large number of sensing elements in the smart skin.

a) Structural Electronic System

Figure 16:
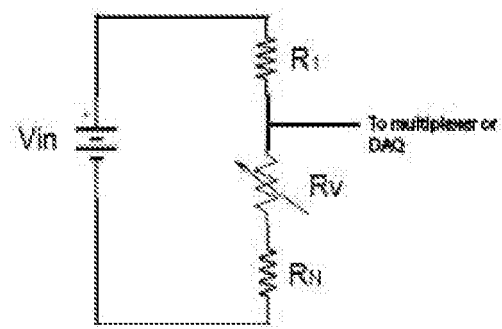
FIG. 16 is a schematic diagram of an analog tagging circuit usable for identifying sensing elements by use of a current limiting resistance.
Figure 17:
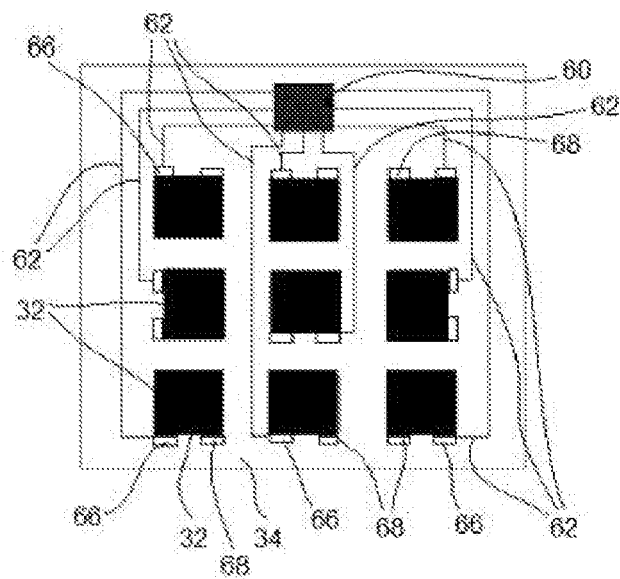
FIG. 17 is a schematic diagram of a sensor system under control of a multiplexing microswitch.

With reference to FIGS. 16 and 17, a sensor network system, for monitoring a large surface area, that does not require dense invasive electrical wiring and instrumentation is described herein. The sensor network system comprises nanocomposite sensing elements disposed on to a substrate, the elements being connected to a non-invasive electrode network, and a control system. In one embodiment, the electrode network is provided by printing conductive silver ink on the polyimide substrate. The silver ink provides high conductivity. In addition, a polyimide substrate is a flexible material that can be applied to flat and curved surfaces, the latter including a pipeline outer surface.

To keep the sensor skin system flexible, electrodes are printed on the substrate surface by, for example, inkjet printing, line patterning, etc. Conductive silver ink can be used for the electrodes since it can be annealed as lower temperatures and can yield conductivity close to bulk silver [Walker et al. 2012]. Therefore, according to an embodiment of the present invention, an electrode network of conductive silver ink can be printed on polyimide sheets (DuPont™ Kapton® FPC). After printing the electrode network, nanocomposite materials are applied on the electrode network through spray painting technique described above to form the sensing elements of the sensor system.

If direct sensing from individual sensing elements is employed for a large number of sensing elements, the sensor system would require crowded electric wiring to communicate with all the elements and large computer power is required to monitor all the sensing elements. This approach is infeasible for the monitoring of pipelines. To overcome this problem, the sensor system of the present invention uses multiplexing micro switches.

The sensor system of the present invention uses surface in-plane resistance measurement with an analog tagging system to identify electrodes in a sensor network having a large number of sensing elements. To analogically tag the electrode, a voltage divide circuit is used. FIG. 16 shows a sample voltage divider circuit that uses a current limiting resistance $R_1$. $R_1$ directly affects the voltage across the sensing elements $R_N$. By changing $R_1$ for each sensing element electrode in periodically, the voltage across the corresponding nanocomposite sensing element can be varied periodically. The initial voltage drop at the sensing element is dictated by the magnitude of $R_1$ to which the element is connected and this helps identify the location of the sensing element electrode in the sensor skin. As hydrocarbon sensitivity depends on the change in voltage across the nanocomposite sensitive elements, and not the initial voltage drop, this method of analog tagging may be used for a large sensor network system, without the need for an analog to digital conversion system which is commonly used for tagging electrodes.

After tagging the each electrode, a multiplexing microswitch 60 is used to record the output from each electrode. The output from the positive electrodes 66 is provided to microswitches 62, while all the passive electrodes 68 are connected together to make a common reference ground for all the electrodes. The multiplexing of the electrode signals allow truncating large numbers of input data into a small amount of data, thereby reducing the need for extensive wiring. The signal from multiplexing microswitch 60 can be de-multiplexed at a later stage and the data from each electrode can be recorded on to a computer system. This data can be processed and analyzed further for determining leakage and finding the source thereof.

b) Data Processing & Monitoring

In one embodiment, ANFIS is used for analyzing the data obtained from the sensing elements in the sensor network. The ANFIS model allows the fusing of different voltage signals coming from the sensing element electrodes and provides decisions under various conditions.

Figure 18:
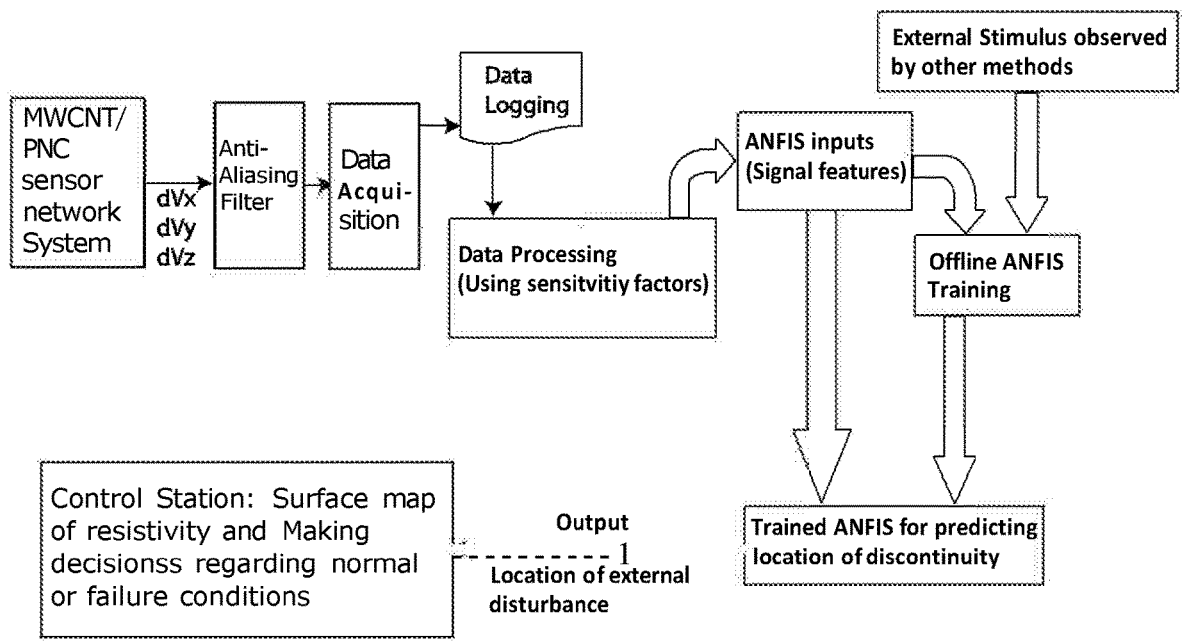
FIG. 18 is a schematic diagram of an ANFIS-based analyzer used for monitoring the nanocomposite sensor network system.

FIG. 18 illustrates the schematics of a sample ANFIS algorithm that may be used for monitoring a sensor network system of the present invention. The differential voltage signals coming from three directions (i.e. dVx, dVy, dVz) of the network of electrodes are passed through anti-aliasing filters. Then, the voltage response is recorded on to a data acquisition system. The voltage signals are pre-processed to extract signal features such as discontinuity. Any external stimulus, such as strain, stress, force, and/or temperature, is measured independently using other measurement systems. The extracted features from the voltage signal and the data acquired by independent measurement are used to train the ANFIS. After training, the inference system can estimate the state of the sensor system from the voltage signals and correlating them with the external parameters in real time. The results from the monitoring algorithm can provide the location of the hydrocarbon leakage or structural failure in the structure.

Leakage detection is possible without rigorous ANFIS analysis for a sensor skin having a small number of sensing element electrodes. ANFIS is desirable for large and/or long pipelines where a greater amount of surface area needs to be covered with the sensor skin and/or where both SE-A and SE-B are used simultaneously in the sensor skin. In a preferred embodiment, ANFIS analysis is used to monitor pipeline surface corrosion and/or hydrocarbon leakage.

By employing a sensor fusion methodology wherein various types of sensors with different functionalities (i.e. hydrocarbon detection, vibration signature change detection, temperature change detection, etc.) are included in the sensor system, reliability, redundancy, and robustness of the sensor system may be improved.

An ANFIS model is preferred for fusing various sensor signals from SE-A and SE-B elements in the sensor skin. In one embodiment, the fusion of the signals is performed by a set of fuzzy rules that transforms the inputs, i.e. any signals of voltage change acquired from the different sensors into a possible output which determines the status of the surface covered by the sensing elements. The amalgamation of different signals may increase the reliability of leakage detection, pipeline failure prediction, and failure and/or leakage localization.

Figure 19:
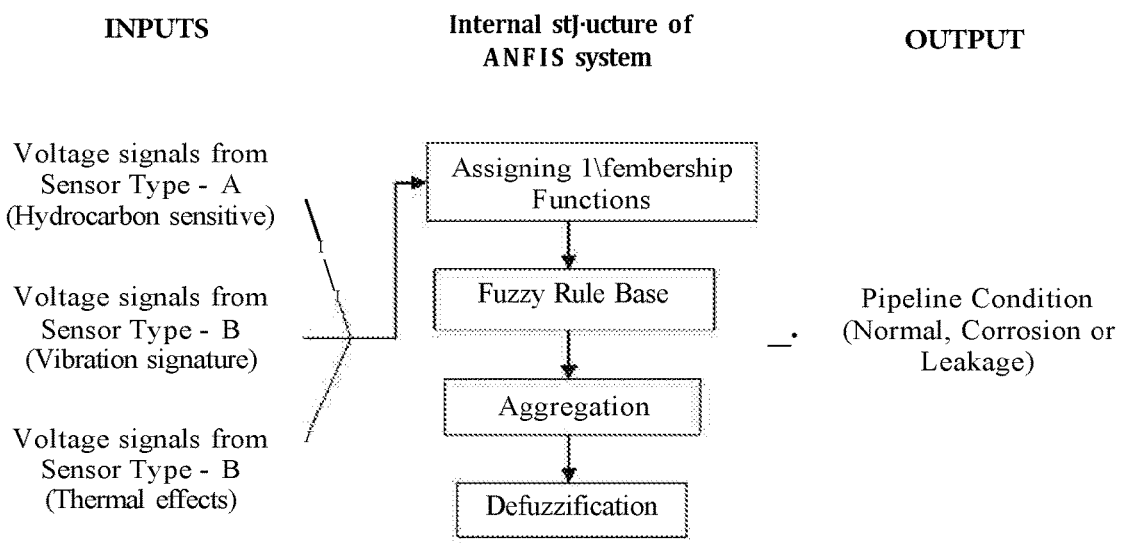
FIG. 19 shows a fuzzy inference system structure usable in combination with the ANFIS of FIG. 18.

FIG. 19 depicts the fuzzy analysis process where the input is the amalgamated voltage response from the different types of sensors and the estimated variations of the voltage parameters. The internal structure of the ANFIS system ("inference engine"), to which the input is fed and from which the output is produced, comprises the following processes: (i) assigning membership functions; (ii) fuzzification ("fuzzy rule base"); (iii) fuzzy rule-based aggregation; and (iv) defuzzification. To provide this qualitative assessment, the fuzzy logic model requires proper membership functions.

In one embodiment, the development of the ANFIS-based pipeline monitoring scheme is completed in two phases, i.e., training phase and verification phase. In the training phase, input variables include voltage responses related to hydrocarbon sensing, vibration signature and temperature signals from the two types of sensors. The training datasets comprising voltage responses from a hydrocarbon leakage, or vibration signature changes due to corrosion or temperature change, all based on laboratory experiments, are provided to ANFIS. The training of the ANFIS-based scheme is an iterative process. Once the training phase is completed, the verification of the trained ANFIS scheme is performed using multiple verification datasets of the input variables obtained from the experiments on the pipeline in different conditions, such as pipeline in normal operation, corroded, and with hydrocarbon leakage. The number of membership functions and types are then defined for each of the input variables. "If and then" rules are generated using first-order Sugeno fuzzy model which is represented by following Equation (1) for n inputs and m membership functions.

$$\text{If } (x_1 \text{ is } A_{11}) \text{ and } \ldots (x_n \text{ is } A_{n1}) \text{ then } f_1 = p_{11}x_1 + \ldots + p_{1n}x_n + r_1 \quad (1)$$

Figure 20:
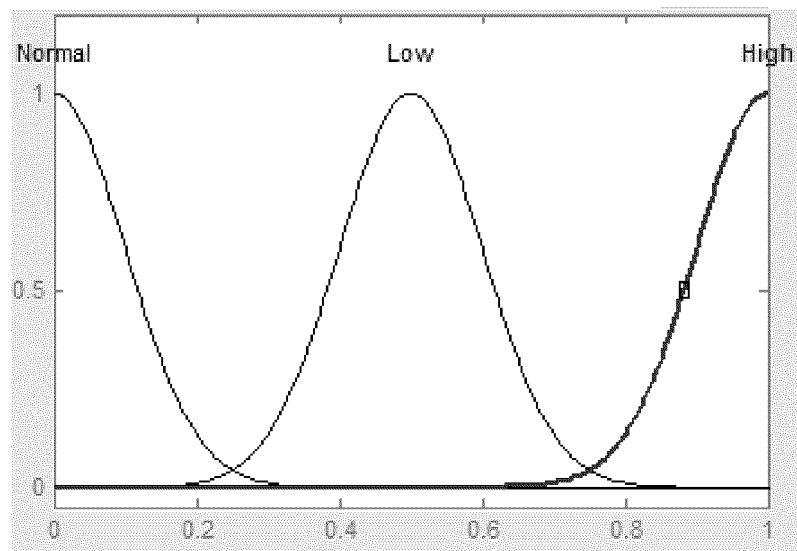
FIG. 20 is a graphical representation of an input membership function usable in pre-processing to classify signals for submission to the ANFIS of FIG. 18 and the fuzzy interface of FIG. 19.

The input membership functions are preferably normalized to the range from 0 to 1. Each of the input variables is mapped by three membership functions, for example, as shown in FIG. 20. Bell type membership functions (MFs) are chosen to map the values for the input variables of the monitoring scheme as shown in FIG. 20. The values up to 0.3 for the membership functions are representative of a normal pipeline, while values from 0.2 to 0.8 represent proximity to a leakage or structural defect (e.g. corrosion), and values more than 0.7 indicate close proximity to a leakage or structural defect on the pipeline. In this way, the pipeline condition is characterized with a certain percentage of two different conditions in the intersecting region. This increases robustness and suitability of the condition assignment of the pipeline.

Figure 21:
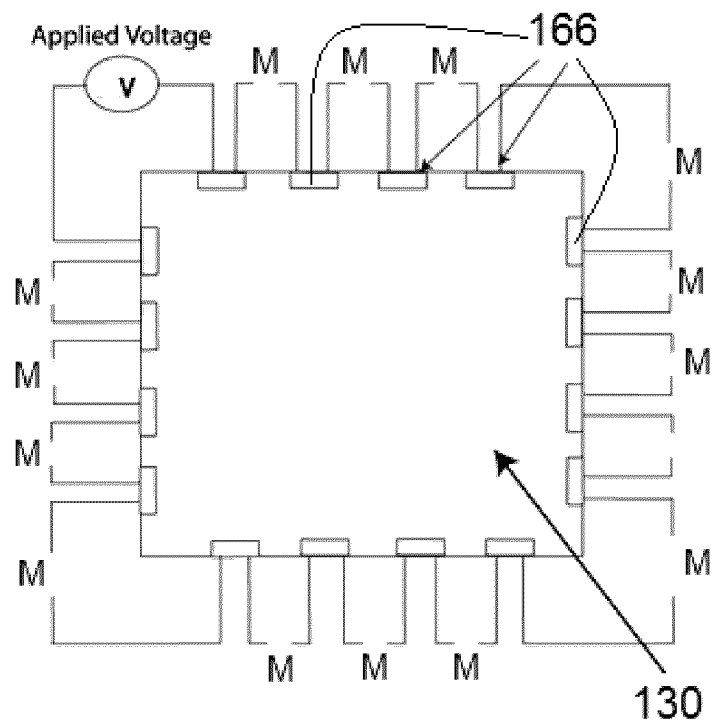
FIG. 21 is a schematic diagram of an exemplary sensing element electrode configuration with sense circuitry to support a large area sensor.

As an alternative to sensor signal fusion, in some embodiments it may not be desirable or feasible to have individual electrodes under each sensing element. It is possible to spray paint sensing element material over a larger surface with a particular sensing solution as described above, to form an integrated sensor skin. For example, the pipeline outer surface may be painted with either SE-A or SE-B material. A calculation technique of Electrical Resistance Tomography (ERT) based upon the configuration shown in FIG. 21 may be used to obtain response from the system and pinpoint a failure location. This method may also be used to detect leaks and/or other defects in underground pipeline and other underground structures.

ERT is a method that calculates the surface distribution of electrical resistivity from a large number of resistance measurements M made from electrodes 166 which are placed at the sides of an integrated sensor skin 130. In this method, electric current is fed through two adjacent electrodes and the voltage change between the remaining electrodes is measured. Based on the type of sensor solution, when there is a disturbance (i.e. hydrocarbon presence, a change in vibration signature, or a change in temperature) on the structure where the integrated sensor skin is applied, the surface resistivity of the sensor skin 130 changes. This change in resistivity may be measured through the electrodes 166 and the electrode system helps determine the exact location of the disturbance. For in-situ application, ERT provides an efficient way to measure the response from a large number of surface resistance measurements.

INDUSTRIAL APPLICATIONS

Figure 22:
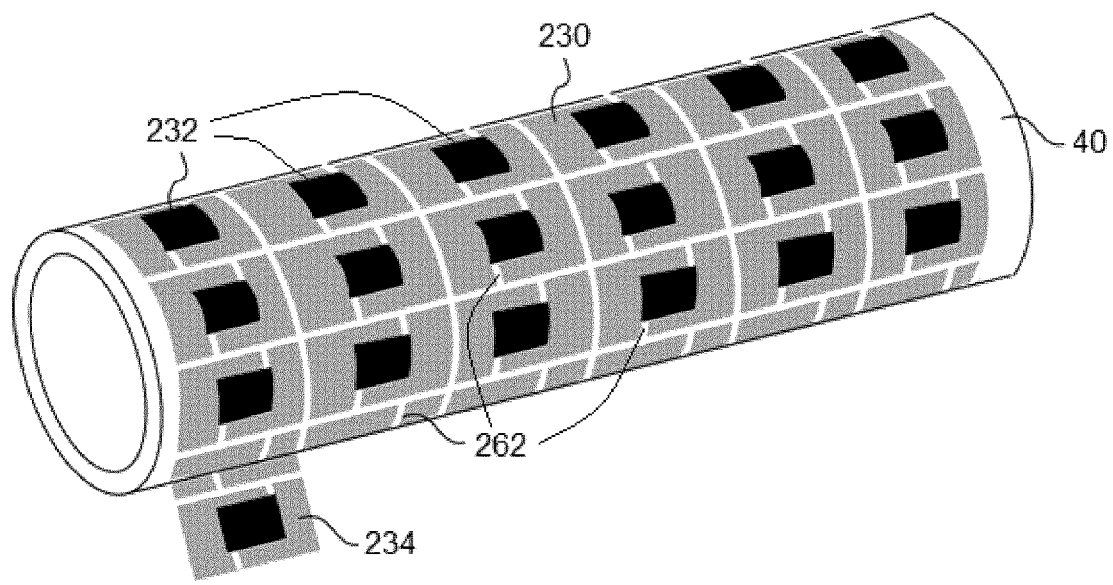
FIG. 22 is a perspective view of a pipe section having a skin with a large number of sensing elements wrapped on its outer surface according to an embodiment of the present invention.
Figure 23:
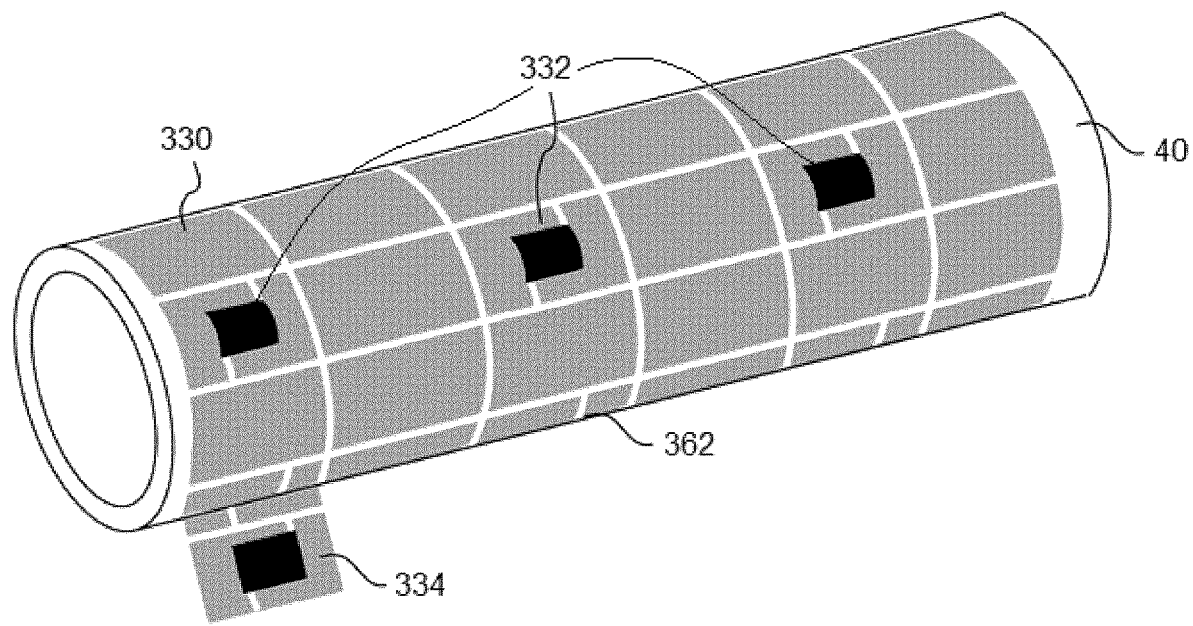
FIG. 23 is a perspective view of a pipe section having a skin with a small number of sensing elements wrapped on its outer surface according to another embodiment of the present invention.
Figure 24:
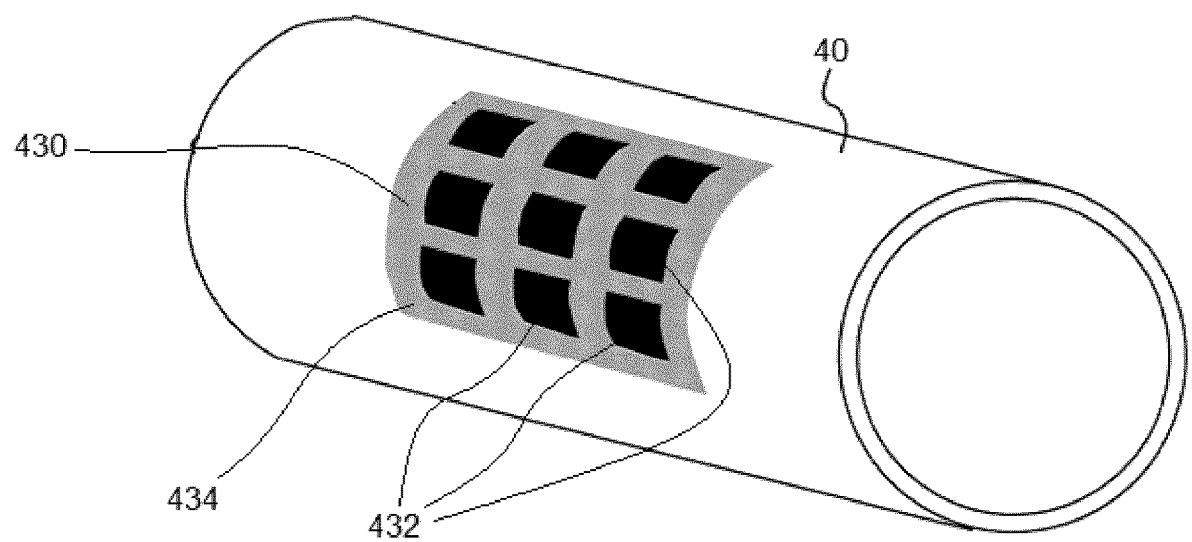
FIG. 24 is a perspective view of a pipe section having a sensor skin disposed at a location on its outer surface according to yet another embodiment of the present invention.

FIGS. 22, 23 and 24 illustrate sample ways of applying the sensor system of the present invention on to a pipe 40. With reference to FIG. 22, a sample sensor system 230 having a large number of sensing elements 232 disposed on a substrate 234 is directly installed on to the outer surface of pipe 40. The sensing element electrodes are connected by electrical connections 262. Another sample sensor system 330 is shown in FIG. 23. Sensor system 330 having a small number of sensing elements 332 disposed on a substrate 334 is installed on to the outer surface of pipe 40. The sensing element electrodes are connected by electrical connections 362.

Yet another sample sensor system 430 is shown in FIG. 24. The sensor system is a patch of sensor skin 430 that is applied to a portion of the outer surface of pipe 40. The patch of sensor skin 430 comprises a plurality of sensing elements 432 disposed on a substrate 434. The patch of sensor skin 430 is applied on to a leakage prone section of pipe 40, without covering a substantial portion of the outer surface of the pipe. Sensor skin 430 may indirectly detect insulating coating wear on the pipe from the presence of short circuits inside the sensor system.

For new pipelines, the sensor system may be incorporated during the construction process of pipe itself. Before coating the pipelines with an insulation layer, the sensor system may be installed first and the insulating layer may be applied on top of the sensor system. In this embodiment, the sensor system is insulated and protected by the insulation layer, which may help prevent damage to the sensor system from the environment and/or vandalism. This embodiment may minimize the need for regular checks and maintenance of the sensor system.

REFERENCES

The following documents are incorporated herein by reference to the same extent as though fully replicated herein.

Patents

1) S. Hara, U.S. Pat. No. 5,498,372, "Oil leakage sensor", 1990.
2) W. L. Hedges, U.S. Pat. No. 5,498,372, "Electrically conductive polymeric compositions", 1996.

3) P. C. Ramamurthy, B. S. Amadio, U.S. Pat. No. 8,012,420 B2, entitled, "Robust low resistance vapor sensor materials", 2011.
4) S. Ha, Y. Kim, Y. Kim, H. Yang, Y. Yang, U.S. Pat. No. 2006/0249384 A1, entitled, "Chemical sensor", 2006.
5) N. V. Myung, S. Mubeen, A. Mulchandani, M. A. Deshusses, E. P. Pat. No. 2572187 A1, entitled, "Metal and metal oxide co-functionalized single walled carbon nanotube for high performance gas sensors", 2013.
6) R. Shah, S. M. Pendo, R. K. Gottlieb, G. Bruso, G. Soundararajan, K. T. Wolfe, U.S. Pat. No. 8,414,489 B2, entitled, "Fabrication of multi-sensor arrays", 2013.
7) B. Pettersson, K. Schneider, K. Siercks, B. Zebhauser, E. P. Pat. No. 2433716 A1, "Surface spraying device with a nozzle control mechanism and corresponding method", 2012.
8) J. S. Morton, E. P. Pat. No. 1740313 A2, entitled, "Cost effective automated preparation and coating methodology for large surfaces", 2007.
9) A. Falcoff, U.S. Pat. No. 4,614,300, entitled, "Computerized spray machine", 1986.
10) M. E. Bruckner, N. G. Chamoun, P. H. Devlin, T. A. Marcus, J. R. Shambroom, U.S. Pat. No. 5,813,404 A, entitled, "Electrode connector system", 1998.
11) W. Westerman, J. G. Elias, U.S. Pat. No. 7,339,580 B2, entitled, "Method and apparatus for integrating manual input", 2008.
12) R. S. Williams, P. J. Kuekes, Y. Chen, U.S. Pat. No. 8,384,136 B2, entitled, "Demultiplexed nanowire sensor array for detection of chemical and biological species", 2013.
13) A. Cataldo, E. P. Pat. No. 2538192 A1, entitled, "Apparatus and method for detection and localization of leaks and faults in underground pipes", 2011.
14) D. W. Payton, U.S. Pat. No. 2007/0247303 A1, "Event localization within a distributed sensor array", 2007.
15) J. C. Roura, P. Prieto, J. Redondo, A. Espinosa, E. P. Pat. No. 2551798 A1, "Genetic Algorithm-based training of an ANFIS for electric energy consumption forecasting", 2013.

Non-Patent Literature

1) Huang J., Jiang Y., Du X., Bi J., 2010, "A New Siloxane Polymer for Chemical Vapor Sensor", Sensors and Actuators B: Chemical, 146, 388-394.
2) Jang R. J., 1993. "ANFIS Adaptive-Network-Based Fuzzy Inference System". IEEE Transactions on the system, man and cybernetics, Vol. 43(3), pp. 665-681.
3) Li J., Lu Y., Ye Q., Cinke M., Han J., Meyyappan M., 2003, "Carbon nanotube sensors for gas and organic vapor detection", Nano Letters, Vol. 3, No. 7: 929-933, pp. 1530-6984.
4) McLachlan D. S., Chiteme C., Park C., Wise K. E., Lowther S. E., Lillehei P. T., Siochi E., Harrison J. S., 2005, "AC and DC percolative conductivity of single wall carbon nanotube polymer composites", Journal of Polymer Science Part B; 43(22), 3273-3287.
5) Raghavan A., Kessler S., Dunn C. T., Berber D., Wicks S., Wardle B. L., 2009, "Structural health monitoring using carbon nanotube enhanced composites", 7$^{th}$ International Workshop on Structural Health Monitoring, Stanford University, CA, USA.
6) Walker S. B., Lewis J. A., 2012, "Reactive silver inks for patterning high-conductivity features at mild temperatures", Journal of the American Chemical Society; 134, 1419-1421.
7) Zhang W., Suhr J., Koratkar N., 2006, "Carbon nanotube/polycarbonate composites as multifunctional strain sensors", J. Nanosci. Nanotechnol., 6(4): 960-964.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A composition for use in a sensing element for one or more of: (i) monitoring leakage, (ii) a structural change, and (iii) temperature change in a hydrocarbon transportation or storage structure, the composition comprising: a polymer; and conductive nanoparticles that are one or both of: (a) carbon nanotubes, and (b) graphene nanoplatelets.

2. The composition of claim 1 wherein the polymer is one or more of: (i) synthetic rubber, (ii) polyvinyl chloride, (iii) polymetheyacrylate, (iv) silicone based polymer; and (v) thermoplastic polymer.

3. The composition of claim 1 wherein the polymer is a polysiloxane copolymer.

4. The composition of claim 1 wherein the polymer is 90 wt. % polysiloxane copolymer, and the conductive and/or semi conductive nanoparticles are one of: (i) 10 wt. % multiwalled carbon nanotubes; (ii) 5 wt. % multiwalled carbon nanotubes and 5 wt. % graphene nanoplatelets; (iii) 5 wt. % multiwalled carbon nanotubes and 5 wt. % titanium dioxide; (iv) 5 wt. % multiwalled carbon nanotubes and 5 wt. % zinc oxide; and (v) 5 wt. % multiwalled carbon nanotubes and 5 wt. % iron (III) oxide, or wherein the polymer is 85 wt. % polysiloxane copolymer and the conductive and/or semi conductive nanoparticles are 5 wt. % multiwalled carbon nanotubes, 5 wt. % graphene nanoplatelets, and 5 wt. % zinc oxide.

5. A sensor system for one or more of: (i) monitoring leakage, (ii) a structural change, and (iii) temperature change in a hydrocarbon transportation or storage structure, the sensor system comprising:
one or more sensing element comprising a polymer and conductive nanoparticles that are one or both of: (a) carbon nanotubes, and (b) graphene nanoplatelets, wherein each sensing element has a positive electrode and a passive electrode, the passive electrode being connected to ground; and a data acquisition system in communication with the positive electrode, for receiving electrical signals from the one or more sensing elements.

6. The sensor system of claim 5 wherein the polymer is 90 wt. % polysiloxane copolymer, and the conductive and/or semi conductive nanoparticles are one of: (i) 10 wt. % multiwalled carbon nanotubes; (ii) 5 wt. % multiwalled carbon nanotubes and 5 wt. % graphene nanoplatelets; (iii) 5 wt. % multiwalled carbon nanotubes and 5 wt. % titanium dioxide; (iv) 5 wt. % multiwalled carbon nanotubes and 5 wt. % zinc oxide; and (v) 5 wt. % multiwalled carbon nanotubes and 5 wt. % iron (III) oxide, or wherein the polymer is 85 wt. % polysiloxane copolymer and the conductive and/or semi conductive nanoparticles are 5 wt. % multiwalled carbon nanotubes, 5 wt. % graphene nanoplatelets, and 5 wt. % zinc oxide.

7. The sensor system of claim 5 wherein at least one of the positive electrode and the passive electrode comprise one or more of: silver, copper, gold, and platinum.

8. The sensor system of claim 5 wherein the one or more sensing element is apply-able directly on to at least a portion of the hydrocarbon transportation or storage structure.

9. The sensor system of claim 5 further comprising a substrate and wherein the one or more sensing element is disposed on to the substrate, and the substrate is installable on at least a portion of the hydrocarbon transportation or storage structure.

10. The sensor system of claim 9 wherein the substrate comprises one or more of: polyimide, polyethylene terephthalate (PET), polycarbonate (PC), and fluorene polyester polyimide.

11. The sensor system of claim 9 wherein the one or more sensing element is disposed on to the substrate by one or more of: spray painting, silk screening, and spin coating.

12. A system for collecting and processing signals from a sensor network comprising a plurality of sensing elements, each of the sensing elements exhibiting a change in resistance in response to one or more of: presence of hydrocarbon, a change in vibration signature, and temperature change, each of the sensing elements having an electrode, the system comprising:
- a voltage divider circuit connected to each of the sensing elements for converting the change in resistance therein into a voltage signal, the voltage divider circuit comprising a current limiting resistance connected in series to sensing element;
- a multiplexer microswitch in communication with the voltage divider circuit, for detecting and recording the voltage signals; and
- an adaptive neuro-fuzzy inference system (ANFIS) in communication with the multiplexer microswitch, the ANFIS calibrated to process the voltage signals and provide information relating to the status of the sensor network's surroundings.

13. The system of claim 12, wherein the current limiting resistance is varied across each sensing element to provide a unique representative voltage to each sensing element.

14. The system of claim 12 further wherein an analog electrode tagging process is used to locate at least one of the electrodes in the sensor network.

15. The system of claim 12, wherein the multiplexer microswitch is controlled by a microcontroller clock establishing a frequency for the switching from one electrode to another.

16. The system of claim 12 wherein the sensor network is apply-able on to a surface of a hydrocarbon transportation and/or storage structure.

17. The system of claim 12, wherein the ANFIS is calibrated to take into account temperature effects on the sensor network.

18. The system of claim 12, further comprising a de-multiplexer system for de-multiplexing signals output by the multiplexer microswitch, and wherein the de-multiplexed signals are processed using an ANFIS algorithm.

* * * * *